(12) United States Patent
Corley et al.

(10) Patent No.: US 7,103,668 B1
(45) Date of Patent: *Sep. 5, 2006

(54) METHOD AND APPARATUS FOR DISTRIBUTING MULTIMEDIA TO REMOTE CLIENTS

(75) Inventors: Janine W. Corley, Fallbrook, CA (US); Jeffrey M. Davey, Fallbrook, CA (US); Bruce W. Johnson, Carlsbad, CA (US); Dale R. Johnson, Carlsbad, CA (US); Christopher D. Lund, San Diego, CA (US); Tien H. Nguyen, San Diego, CA (US); Keith O. Rice, Escondido, CA (US); Leonid B. Volfson, Del Mar, CA (US)

(73) Assignee: Inetcam, Inc., San Diego, CA (US)

( * ) Notice: Subject to any disclaimer, the term of this patent is extended or adjusted under 35 U.S.C. 154(b) by 991 days.

This patent is subject to a terminal disclaimer.

(21) Appl. No.: 09/652,113

(22) Filed: Aug. 29, 2000

(51) Int. Cl.
*G06F 13/00* (2006.01)

(52) U.S. Cl. ............... 709/231; 709/232; 725/105

(58) Field of Classification Search ........... 709/233, 709/232, 231, 228; 725/105
See application file for complete search history.

(56) References Cited

U.S. PATENT DOCUMENTS

| | | | | |
|---|---|---|---|---|
| 5,953,506 A | * | 9/1999 | Kalra et al. ............ | 709/231 |
| 6,076,109 A | * | 6/2000 | Kikinis ............... | 709/228 |
| 6,091,777 A | * | 7/2000 | Guetz et al. ........... | 375/240.11 |
| 6,345,279 B1 | * | 2/2002 | Li et al. ............. | 707/104.1 |
| 6,449,653 B1 | * | 9/2002 | Klemets et al. ......... | 709/231 |
| 6,594,699 B1 | * | 7/2003 | Sahai et al. .......... | 709/228 |
| 2005/0207495 A1 | * | 9/2005 | Ramasastry et al. ... | 375/240.16 |

* cited by examiner

*Primary Examiner*—Kenneth R. Coulter
(74) *Attorney, Agent, or Firm*—Knobbe, Martens, Olson & Bear, LLP

(57) ABSTRACT

Video and audio signals are streamed to remote viewers that are connected to a communication network. A host server receives an originating video and audio signal that may arrive from a single source or from a plurality of independent sources. The host server provides any combination of the originating video and audio signals to viewers connected to a communication network. A viewer requests the host server provide a combination of video and audio signals from the host server. The host server transmits an instruction set to be executed by the viewer. The instruction set causes the viewer to transmit parameters to the host user, including parameters relating to the processing capabilities of the viewer. The host server then transmits multimedia data to the viewer according to the received parameters. A plurality of viewers may be simultaneously connected to the host server. Each of the plurality of viewers may configure the received video and audio signals independent of any other viewer and may generate alerts based on the video and audio content.

31 Claims, 17 Drawing Sheets

FIG. 6

Video Stream Format

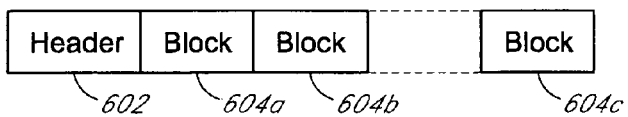

Video Header

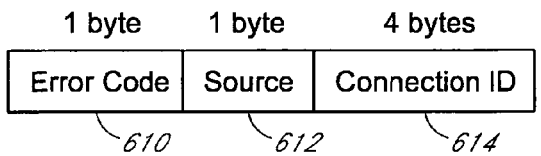

Note: If Error Code is non-zero, no bytes will follow and the stream is complete.

0= success
not zero= error

0= host
1= mirror

Video Block

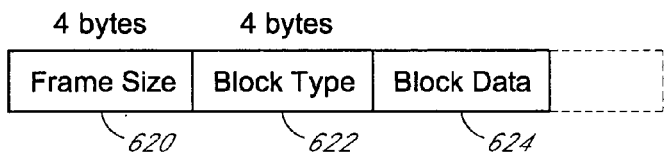

The following are the possible block types and their block data formats

Block Type = N (N>0), Portial Frame

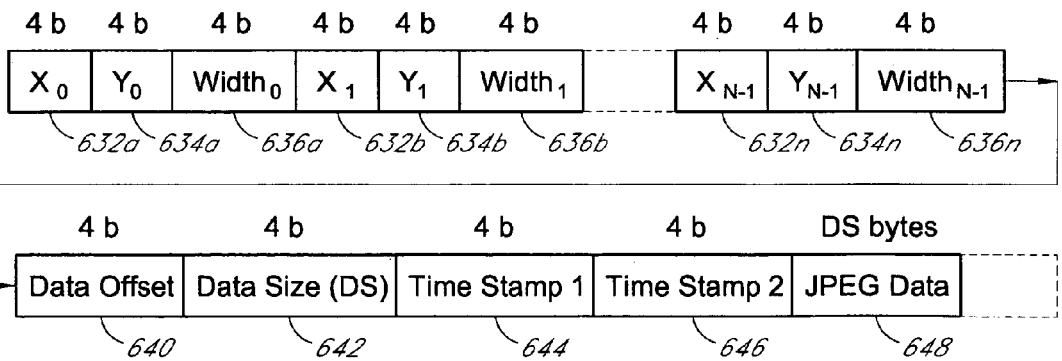

In this case, the image consists of N segments arranged in a horizontal "stripe". The ($X_k$, $Y_k$, $Width_k$) triplets describe the destination position and width of each segment. Each segment is 16 pixels tall.

Figure:
(A "strip" image)

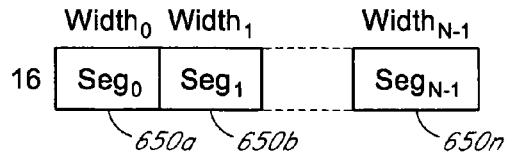

FIG. 7

Block Type = -3, Single Block

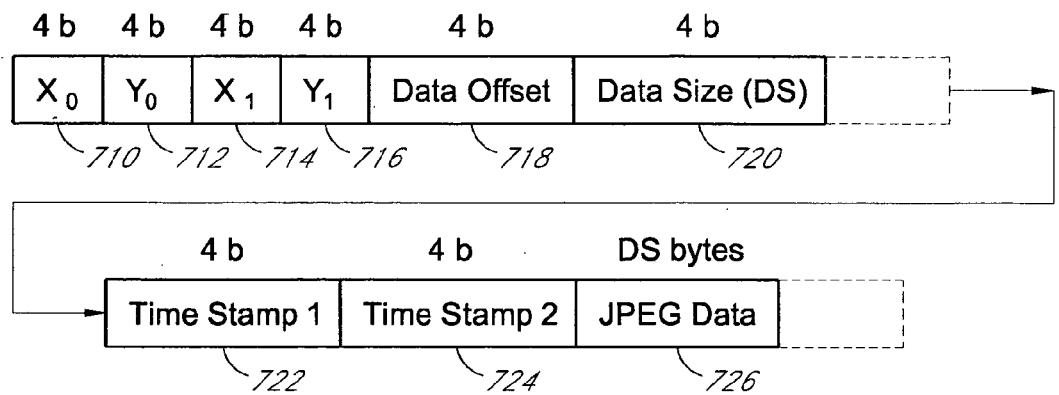

In this case, the JPEG is a single rectangle which is moved to $(X_0, Y_0) - (X_1, Y_1)$ in the destination image.

Block Type = -4, Synchronization Frame

The format of this Block is identical to the Single Block described above with $X_0 = 0$, $Y_0 = 0$, $X_1 =$ Width of Image, $Y_1 =$ Height of Image. The block is used to resynchronize the video stream with real time.

Block Type = -1, New Image Size

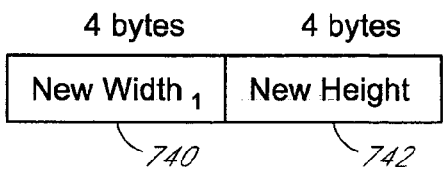

This block indicates a change in the transmitted image size. It is immediately followed by a full image Single Block frame.

Block Type = -2, Error Block

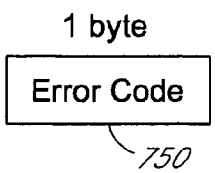

This block indicates an error in the stream. The transmission is terminated following the error code.

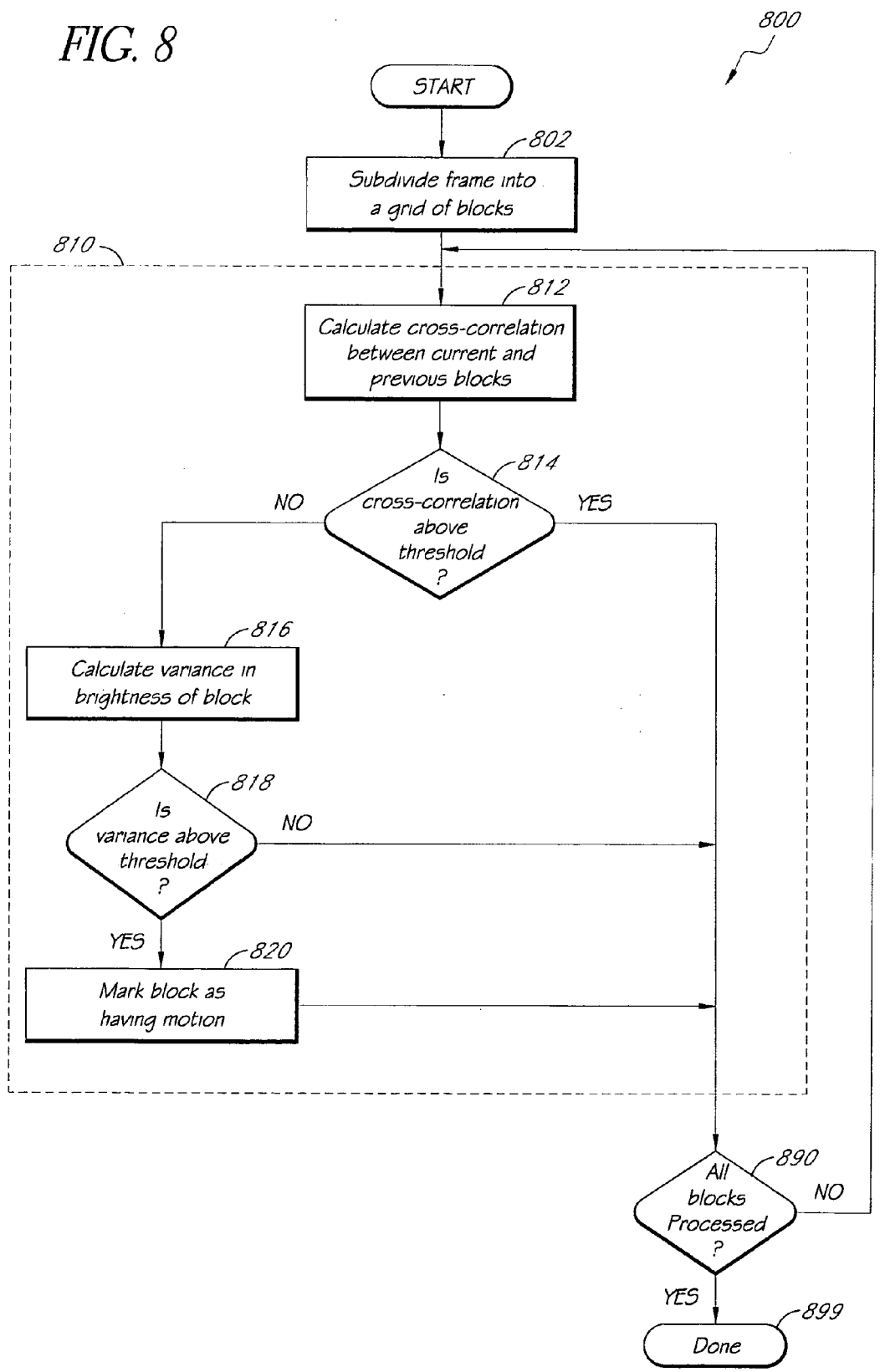

Audio Stream Format
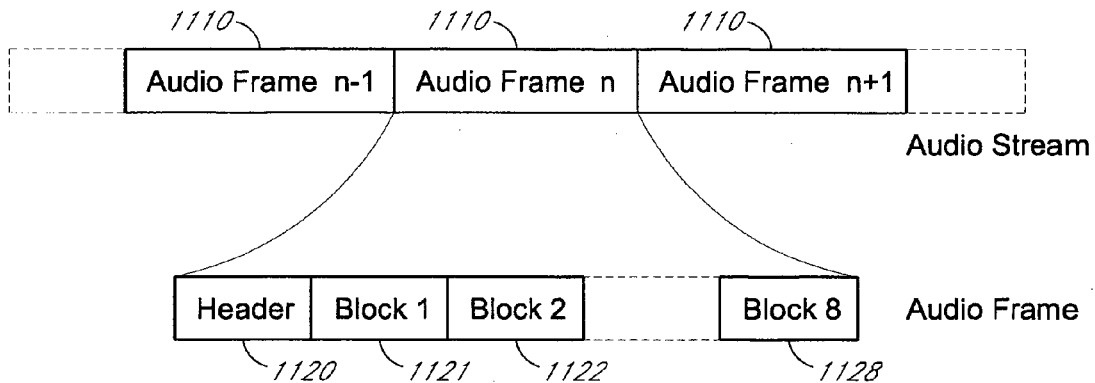
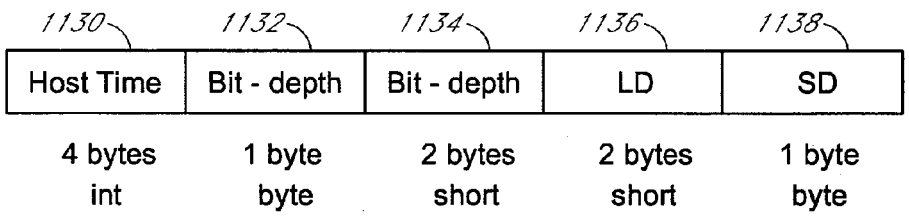
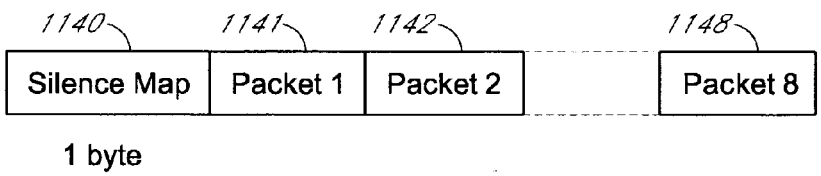
Each bit in the silence map indicates whether the corresponding packet exists in the stream.
Each packet consists of 32 samples of 2-, 4-, or 8-bits each (thus 8, 16, or 32 bytes per packet).
2- and 4-bit encodins are in ADDCM format.
8-bit encoding is $\mu$-law compressed samples.
*FIG. 11*

METHOD AND APPARATUS FOR DISTRIBUTING MULTIMEDIA TO REMOTE CLIENTS

BACKGROUND OF THE INVENTION

1. Field of the Invention

The invention relates to devices and systems for communicating over a network. More particularly, the invention relates to a method and apparatus for streaming a multimedia signal to remote viewers connected to a communication network.

2. Description of the Related Art

The constantly increasing processing power available in hardware devices such as personal computers, personal digital assistants, wireless phones and other consumer devices allows highly complex functions to be performed within the device. The hardware devices can perform complex calculations in order to implement functions such as spreadsheets, word processing, database management, data input and data output. Common forms of data output include video and audio output.

Personal computers, personal digital assistants and wireless phones commonly incorporate displays and speakers in order to provide video and audio output. A personal computer incorporates a monitor as the display terminal. The monitor, or display, on most personal computers can be configured independently of the processor to allow varying levels of resolution. The display for personal computers is typically capable of very high resolution, even on laptop-style computers.

In contrast, displays are permanently integrated into personal digital assistants and wireless phones. An electronic device having a dedicated display device formats data for display using dedicated hardware. The processing capabilities of the hardware as well as the display capabilities limit the amount of information displayed and the quality of the display to levels below that typically available from a personal computer. The lower quality is defined as fewer pixels per inch, the inability to display colors or a smaller viewing area.

A personal computer may integrate one of a number of hardware interfaces in order to display video output on a monitor. A modular video card or a set of video interface Integrated Circuits (IC's) is used by the personal computer to generate the digital signals required to generate an image on the monitor. The digital signals used by a computer monitor differ from the analog composite video signal used in a television monitor. However, the personal computer may incorporate dedicated hardware, such as a video capture card, to translate analog composite video signals into the digital signals required to generate an image on the monitor. Thus, the personal computer may display, on the monitor, video images captured using a video camera, or video images output from a video source such as a video tape recorder, digital video disk player, laser disk player, or cable television converter.

The video capture card, or equivalent hardware, also allows the personal computer to save individual video frames provided from a video source. The individual video frames may be saved in any file format recognized as a standard for images. A common graphic image format is the Joint Photographic Experts Group (JPEG) format that is defined in International Organization for Standardization (ISO) standard ISO-10918 titled DIGITAL COMPRESSION AND CODING OF CONTINUOUS-TONE STILL IMAGES. The JPEG standard allows a user the opportunity to specify the quality of the stored image. The highest quality image results in the largest file, and typically, a trade off is made between image quality and file size. The personal computer can display a moving picture from a collection of JPEG encoded images by rapidly displaying the images sequentially, in much the same way that the individual frames of a movie are sequenced to simulate moving pictures.

The volumes of data and image files generated within any individual personal computer provide limited utility unless the files can be distributed. Files can be distributed among hardware devices in electronic form through mechanical means, such as by saving a file onto a portable medium and transferring the file from the portable medium (e.g., floppy disks) to another computer.

Such mechanical file transfers are not particularly efficient and may be limited by the capacity of the transfer medium. A more efficient method of transferring files between computers is by using some type of communication link. The most basic communication link is a hardwired connection between the two computers transferring information. However, information may also be transferred using a network of computers.

A computer may be connected to a local network where a number of processors are linked together using dedicated communication links. File transfer speed on a dedicated network is typically constrained by the speed of the communication hardware. The physical network is typically hardwired and capable of providing a large signal bandwidth.

More widespread remote networks may take advantage of existing infrastructure in order to provide the communication link between networked processors. One common configuration allows remote devices to connect to a network using telephone land lines. The communication link is the factor constraining data transfer speed where low bandwidth communication links such as telephone land lines are used as network connections.

One well known public network that allows a variety of simultaneous communication links is the Internet. As used herein, "Internet" refers to a network or combination of networks spanning any geographical area, such as a local area network, wide area network, regional network, national network, and/or global network. As used herein, "Internet" may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems.

Individual computers may connect to the Internet using communication links having vastly differing information bandwidths. The fastest connections to the network use fiber connections directly to the network "backbone". Connections to the network having a lower information bandwidth use E1 or T1 telephone line connections to a fiber link. Of course, the cost of the communication link is proportional to the available information bandwidth.

Network connections are not limited to computers. Any hardware device capable of data communication may be connected to a network. Personal digital assistants as well as wireless phones typically incorporate the ability to connect to networks in order to exchange data. Hardware devices often incorporate the hardware or software required to allow the device to communicate over the Internet. Thus, the Internet operates as a network to allow data transfer between computers, network-enabled wireless phones, and personal digital assistants.

One potential use of networks is the transfer of graphic images and audio data from a host to a number of remote viewers. As discussed above, a computer can store a number of captured graphic images and audio data within its memory. These files can then be distributed over the network to any number of viewers. The host can provide a simulation of real-time video by capturing successive video frames from a source, digitizing the video signal, and providing access to the files. A viewer can then download and display the successive files. The viewer can effectively display real-time streaming video where the host continually captures, digitizes, and provides files based on a real-time video source.

The distribution of captured real-time video signals over a network presents several problems. For example, there is no flexibility in the distribution of files to various users. A host captures the video and audio signals and generates files associated with each type of signal. As previously discussed, graphic images are commonly stored as JPEG encoded images. The use of JPEG encoding can compress the size of the graphic image file but, depending on the graphic resolution selected by the host, the image file may still be very large. The network connection at the host is an initial bottleneck to efficient file transfer. If the host sends files to the network using only a phone modem connection to transfer multiple megabyte files, no viewer will be able to display the video and audio signals in a manner resembling real-time streaming video.

The viewer's network connection becomes another data transfer bottleneck even if the host can send files to the network instantaneously. A viewer with a phone modem connection will not be able to transfer high-resolution images at a speed sufficient to support real-time streaming video.

One option is for the host to capture and encode any images in the lowest possible resolution to allow even the slowest connection to view real-time streaming video. However, the effect of capturing low-resolution images to enable the most primitive system's access to the images is to degrade the performance of a majority of viewers. Additionally, the images may need to be saved in such a low resolution that all detail is lost from the images. Degradation of the images, therefore, is not a plausible solution.

Another problem encountered is the inability of all users to support the same graphical image format selected by the host. Most personal computers are able to support the JPEG image format; however, network-enabled wireless phones or personal digital assistants may not be able to interpret the JPEG image format. Additionally, the less sophisticated hardware devices may not incorporate color displays. Access to video images should be provided to these users as well.

Finally, in such video distribution systems, the viewer has no control over the images. The viewer must rely solely on the host to provide a formatted and sized image having the proper view, resolution, and image settings. The viewer cannot adjust the image being displayed, the image resolution, or the image settings such as brightness, contrast and color. Further, the viewer is unable to control such parameters as compression of the transmitted data and the frame rate of video transmission.

SUMMARY OF THE INVENTION

The present invention is directed to an apparatus and method of transferring video and/or audio data to viewers such that the viewers can effectively display real-time streaming video output and continuous audio output. The apparatus and method may adapt the streaming video to each viewer such that system performance is not degraded by the presence of viewers having slow connections or by the presence of viewers having different hardware devices. The apparatus and method can further provide a level of image control to the viewer where each viewer can independently control the images received.

BRIEF DESCRIPTION OF THE DRAWINGS

The features, objectives, and advantages of the invention will become apparent from the detailed description set forth below when taken in conjunction with the drawings, wherein like parts are identified with like reference numerals throughout, and wherein:

FIG. 6 is a block diagram of a video stream format.

FIG. 7 is a block diagram of various video block formats.

FIG. 8 is a flow chart illustrating motion detection at a block level.

FIG. 11 is a block diagram of an audio stream format.

DETAILED DESCRIPTION OF THE PREFERRED EMBODIMENTS

Figure 1:
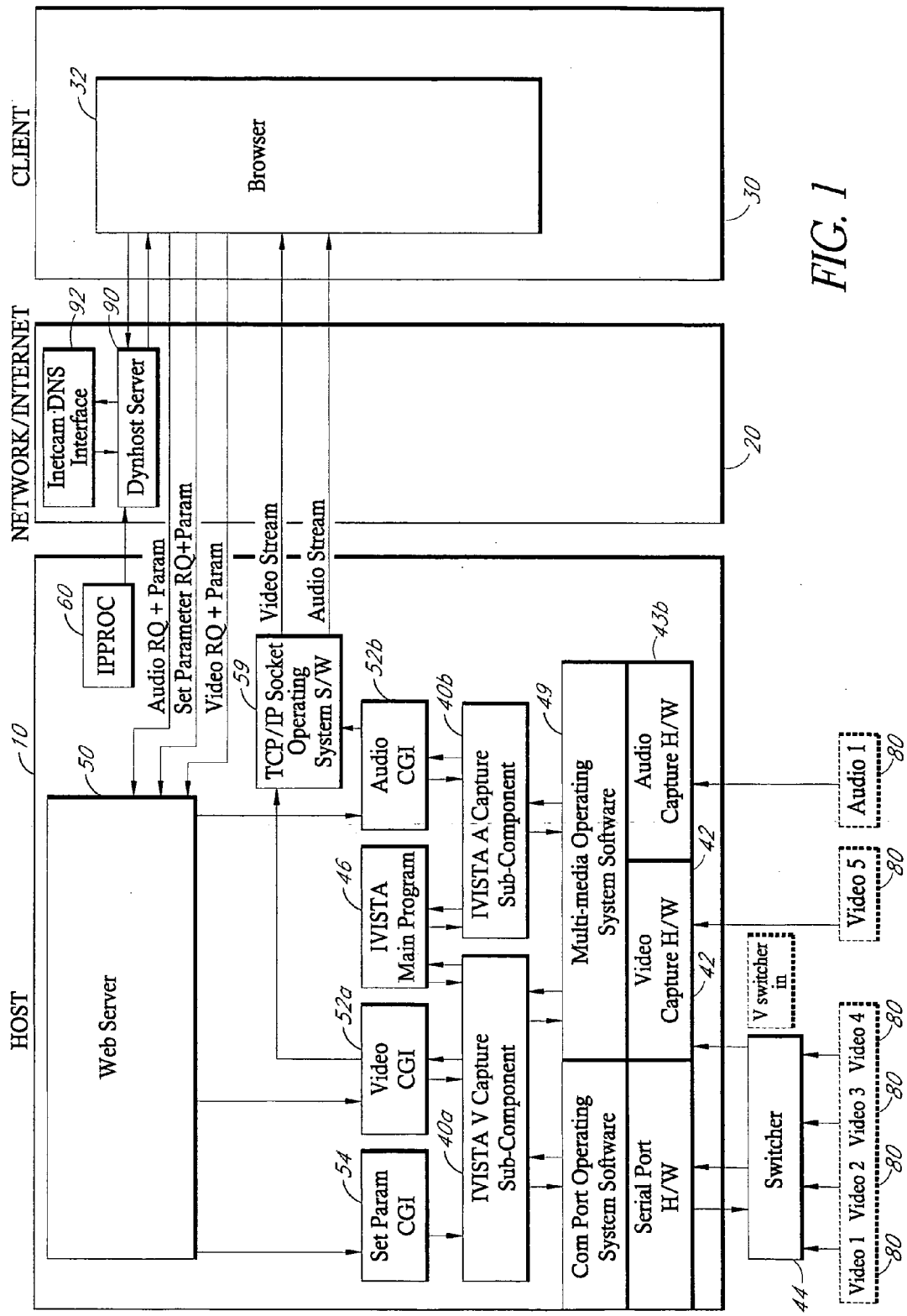
FIG. 1 is a block diagram of one embodiment of a multimedia distribution system.

As used herein, a computer, including one or more computers comprising a web server, may be any microprocessor- or processor-controlled device or system that permits access to a network, including terminal devices, such as personal computers, workstations, servers, clients, mini computers, main-frame computers, laptop computers, a network of individual computers, mobile computers, palm-top computers, hand-held computers, set top boxes for a television, interactive televisions, interactive kiosks, personal digital assistants, interactive wireless communications devices, mobile browsers, or a combination thereof. The computers may further possess input devices such as a keyboard, mouse, touchpad, joystick, pen-input-pad, and output devices such as a computer screen and a speaker.

These computers may be uni-processor or multi-processor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to a networked communication medium.

Furthermore, the computers execute an appropriate operating system such as Linux, Unix, Microsoft® Windows®, Apple® MacOS®, and IBM® OS/2®. As is convention, the appropriate operating system includes a communications protocol implementation which handles all incoming and outgoing message traffic passed over a network. In other embodiments, while different computers may employ different operating systems, the operating system will continue to provide the appropriate communications protocols necessary to establish communication links with a network.

The computers may advantageously contain program logic, or other substrate configuration representing data and instructions, which cause the computer to operate in a specific and predefined manner as described herein. In one embodiment, the program logic may advantageously be implemented as one or more modules.

As can be appreciated by one of ordinary skill in the art, each of the modules may comprise various sub-routines, procedures, definitional statements and macros. Each of the modules is typically separately compiled and linked into a single executable program. Therefore, the description of each of the modules in this disclosure is used for convenience to describe the functionality of the preferred system. Thus, the processes that are performed by each of the modules may be arbitrarily redistributed to one of the other modules, combined together in a single module, or made available in, for example, a shareable dynamic link library.

The modules may advantageously be configured to reside on the addressable storage medium and configured to execute on one or more processors. The modules include, but are not limited to, software or hardware components which perform certain tasks. Thus, a module may include, by way of example, components, such as, software components, object-oriented software components, class components and task components, processes, functions, attributes, procedures, subroutines, segments of program code, drivers, firmware, microcode, Java byte codes, circuitry, data, databases, data structures, tables, arrays, and variables.

As used herein, multimedia refers to data in any form. For example, it may include video frames, audio blocks, text data, or any other data or information. Multimedia information may include any individual form or any combination of the various forms.

A block diagram of a multimedia distribution system according to aspects of the invention is shown in FIG. 1. The system is composed of a host 10 interfaced through, for example, a network 20 to at least one client 30. The host 10 is a computer including one or more processes or modules and may interface with various hardware devices on the computer. A process or module may be a set of instructions implemented in software, firmware or hardware, including any type of programmed step undertaken by components of the system. The client 30 is another computer including one or more process or modules. Advantageously, the client 30 is a remote computer interconnected to the host 10 through a network 20. The network 20 is any type of communication network as is commonly known by one skilled in the field and as was described previously. The network 20 may be a Local Area Network (LAN), a Wide Area Network (WAN), a public network such as the Internet, or a wireless network or any combination of such networks. The network 20 interconnection between the host 10 and the client 30 may be accomplished using hard wired lines or through wireless Radio Frequency (RF) links. The various embodiments of the invention are not limited by the interconnection method used in the network 20 or the physical location of the host 10 or clients 30.

A number of processes operate within the host 10 in order to allow the host 10 to interface with external devices 80 and with the client 30 through the network 20. One or more capture devices 42 interface with external devices 80 in order to transform the data provided by an external device 80 into a format usable by the host 10. In one embodiment, the capture device 42 is a video capture card that interfaces to an external video source. The video source may be generated by a video camera, video disc player, video cassette recorder, television video output, or any other device capable of generating a video source. The video capture card grabs the frames from the video source, converts them to digital signals, and formats the digital signals into a format usable by the host 10. The external device 80 may also be a video card within a computer for converting video signals that are routed to a monitor into a format usable by the host 10.

The external devices 80 are not limited to video sources and can include devices or sources of data of interest. For example, the external devices 80 may generate audio data. The capture device 42 interfaces with an audio source to convert the input signal to a digital signal, then to convert the digital signals into a format usable by the host 10. A variety of external devices 80 may be used to provide an audio signal. An audio signal may be provided from a microphone, a radio, a compact disc player, television audio output, or any other audio source.

Multiple external devices 80 may interface with the host 10. The external devices 80 may provide inputs to the host 10 simultaneously, sequentially, or in some combination. A switcher module 44 is used where there is a controllable switch (not shown) that is used to multiplex signals from multiple sources to a single capture device 42. The switcher 44 is used where multiple sources are controlled and is omitted if the host 10 does not have control over the selection of the source. If used, the switcher 44 receives control information through a communication port on the computer. An exemplary embodiment of a hardware switch used to multiplex multiple video sources to a single video capture card is provided in copending U.S. patent application Ser. No. 09/439,853, filed Nov. 12, 1999, entitled SIGNAL SWITCHING DEVICE AND METHOD, assigned to the assignee of the current application, and hereby incorporated herein by reference. A similar hardware switch may be used to multiplex multiple audio sources to a single audio capture card.

A multimedia operating system module 49 allows the capture devices to interface with one or more capture modules 40*a*, 40*b*. The capture modules 40*a*, 40*b* monitor the capture devices and respond to requests for images by transmitting the captured information in JPEG-encoded format, for example, to the main program module 46.

The host also includes a web server module 50, such as the Apache web server available from the Apache Software Foundation. The web server 50 is used to configure the host 10 as a web server. The web server 50 interfaces the host 10 with the various clients 30 through the network 20. The web server 50 sets up an initial connection to the client 30 following a client request. One or more Common Gateway Interfaces (CGI) 52*a*, 52*b* are launched for each client 30 by the web server module 50. Each CGI 52 submits periodic requests to the main program 46 for updated video frames or audio blocks. The web server 50 also configures the dedicated CGI 52 adapted to the capabilities of each client 30. The client 30 may monitor the connection and maintains some control over the information sent through the CGI 52. The client 30 can cause the web server 50 to launch a "set param" CGI module 54 to change connection parameters. The web server 50 conveys the control information to the other host processes through the "set param" CGI 54. Once the web server 50 establishes the network connection, the CGI 52 controls the information flow to the client 30.

The client 30 interfaces to the host through the network 20 using an interface module such as a browser 32. Commercially available browsers include Netscape Navigator and Microsoft's Internet Explorer. The browser 32 implements the communication formatting and protocol necessary for communication over the network 20. The client 30 is typically capable of two-way communications with the host 10. The two-way link allows the client 30 to send information as well as receive information. A TCP/IP socket operating system module 59 running on the host 10 allows the host to establish sockets for communication between the host 10 and the client 30.

The host 10 may also incorporate other modules not directly allocated to establishing communications to the client 30. For example, an IP PROC 60 may be included within the host 10 when the host 10 is configured to operate over, for example, the Internet. The IP PROC 60 is used to communicate the host's 10 Internet Protocol (IP) address. The IP PROC 60 is particularly useful when the host's IP address is dynamic and changes each time the host 10 initially connects to the network 20. In one embodiment, the IP PROC 60 at the host 10 works in conjunction with a Domain Name System (DNS) host server 90 (described in further detail below with reference to FIG. 14) connected to the network to allow clients 30 to locate and establish a connection to the host 10 even though the host 10 has a dynamic IP address.

Figure 2:
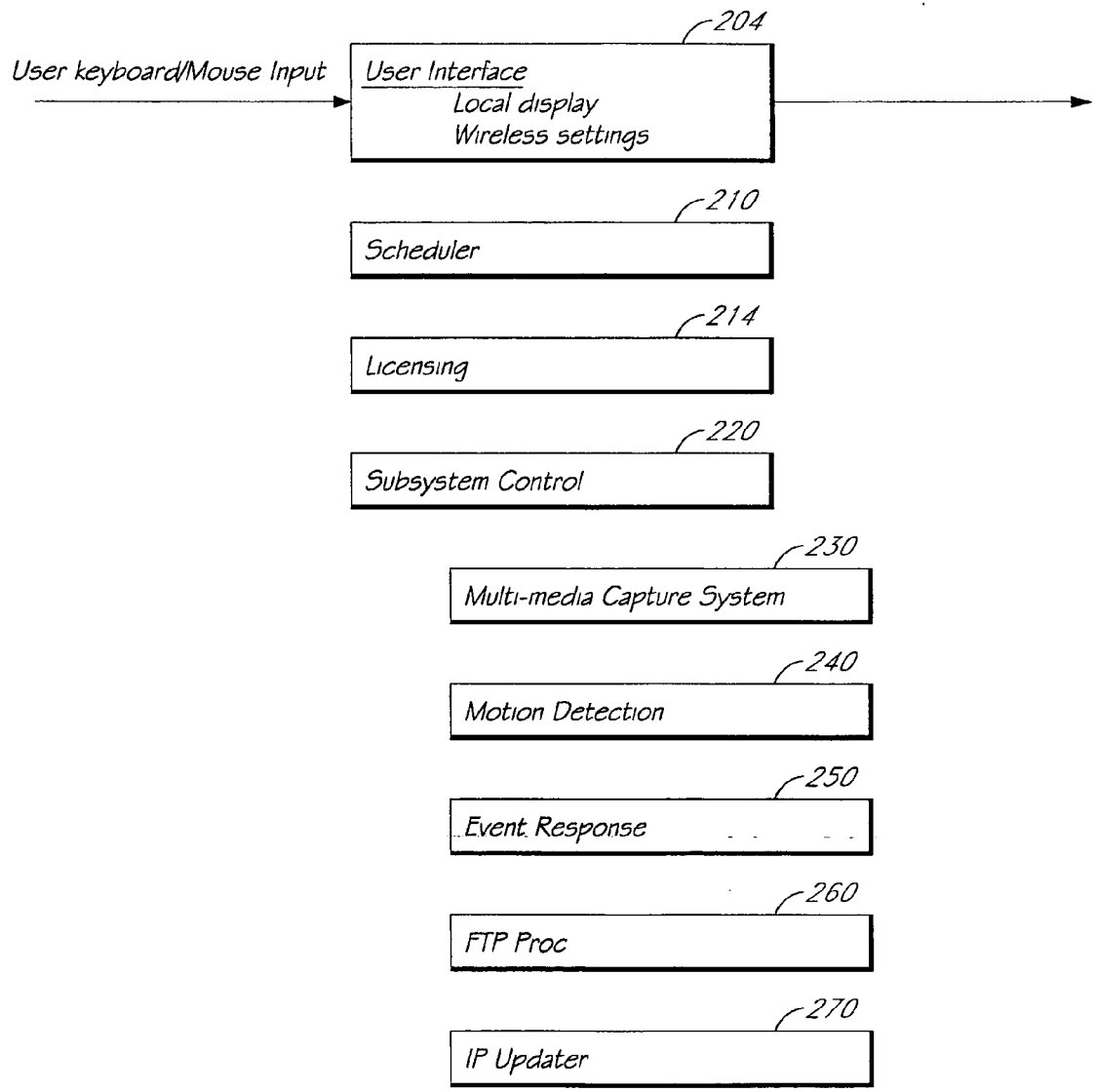
FIG. 2 is an overview of the main program shown in FIG. 1.

An overview of the main program module 46 is provided in FIG. 2. The host implements a user interface 204 to receive input from the user through, for example, a keyboard or a mouse and to provide display and audio output to the user. The output may be in the form of an operating window displayed on a monitor that provides the user with an image display and corresponding control menus that can be accessed using a keyboard, a mouse or other user interface devices. A scheduler 210 operates simultaneously with the user interface 204 to control the operation of various modules. The user or an administrator of the host system may set up the scheduling of multimedia capture using the scheduler 210. Images or audio may be captured over particular time windows under the control of the scheduler 210 and those time windows can be selected or set by a user.

A licensing module 214 is used to either provide or deny the user access to specific features within the system. As is described in detail below, many features may be included in the system. The modularized design of the features allows independent control over user access to each feature. Independent control over user access allows the system to be tailored to the specific user's needs. A user can initially set up the minimum configuration required to support the basic system requirements and then later upgrade to additional features to provide system enhancements. Software licensing control allows the user access to additional features without requiring the user to install a new software version with the addition of each enhancement.

The host also performs subsystem control processes 220. The host oversees all of the subsystem processes that are integrated into the multimedia distribution system. These sub-processes include the multimedia capture system 230 that controls the capture of the video and audio images and the processing and formatting of the captured data. There may be numerous independent CGI processes running simultaneously depending on the number of clients connected to the host and the host's capacity. Each of the CGI processes accesses the network and provides output to the clients depending on the available captured data and the capabilities of the client.

A motion detection 240 process operates on the captured images to allow detection of motion over a sequence of the captured images. Motion detection can be performed on the entire image or may be limited to only a portion of the image. The operation of motion detection will be discussed in detail later.

Another process is an event response 250. The event response 250 process allows a number of predefined events to be configured as triggering events. In addition to motion detection, the triggering event may be the passage of time, detection of audio, a particular instant in time, user input, or any other event that the host process can detect. The triggering events cause a response to be generated. The particular response is configurable and may include generation and transmission of an email message, generation of an audio alert, capture and storage of a series of images or audio, execution of a particular routine, or any other configurable response or combination of responses.

Additional processes include an FTP process 260 and an IP Updater process 270. As discussed with reference to FIG. 1, the FTP process transfers the multimedia data to an FTP server to allow widespread access to the data. The IP Updater 270 operates to update the IP address of the host. The host may be identified by a domain name that is easily remembered. The domain name corresponds to an Internet Protocol address, but the host process may be connected to a network that utilizes dynamic IP addresses. The IP address of the server may change each time the host disconnects and reconnects to the network if dynamic IP addresses are used. The IP Updater 270 operates in conjunction with a Domain Name System (DNS) server to continually update the IP address of the host such that the host's domain name will always correspond to the appropriate IP address.

Figure 3:
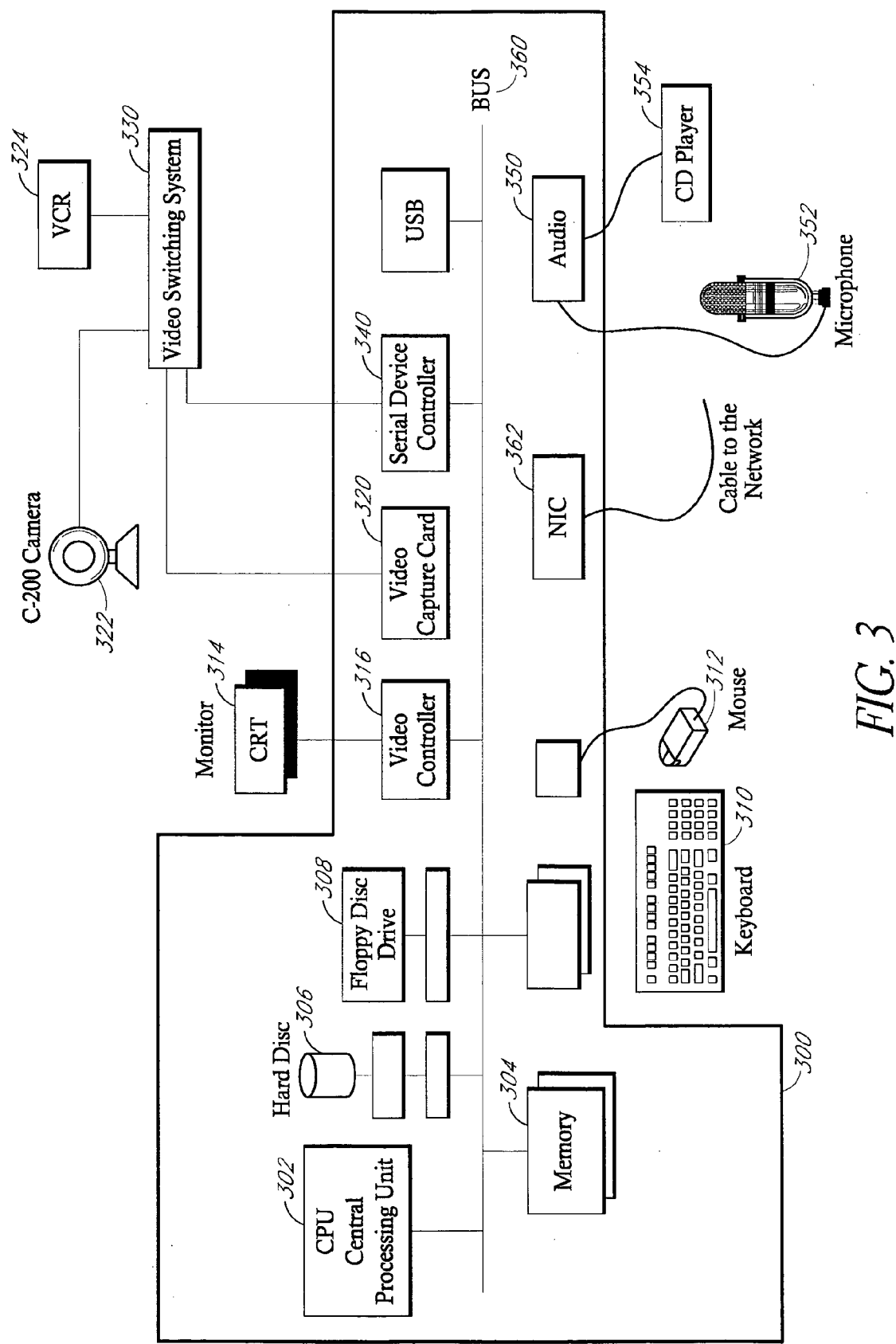
FIG. 3 is a block diagram of a personal computer implementing the host process.

An example of a computer on which the host process resides is illustrated schematically in FIG. 3. The block diagram of FIG. 3 shows the host implemented on a personal computer 300. The host process is stored as a collection of instructions that are stored in the personal computer 300. The instructions may be stored in memory 304, such as Read-Only Memory (ROM) or Random Access Memory (RAM), a hard disk 306, a floppy disk to be used in conjunction with a floppy disk drive 308, or a combination of storage devices. The instructions are executed in the Central Processing Unit (CPU) 302 and are accessed through a bus 360 coupling the storage devices 304, 306, 308 to the CPU 302. The bus 360 can include at least one address bus and one data bus, although multiple buses may also be used. User input is coupled to the personal computer 300 through a keyboard 310, a mouse 312 or other user input device. Images are displayed to the user through a monitor 314 that receives signals from a video controller 316.

Video images are provided to the personal computer 300 from external video sources coupled to a video capture card 320. Although any video source may be used, a camera 322 and VCR 324 are shown in FIG. 3. A video switching system 330 is used to multiplex multiple video sources to a single video capture card 320. The video switching system 330 is controlled through a serial device controller 340. The host process controls which video source is used to supply the input by controlling the video switching system 330. The video switching system 330 is described further in the patent application previously incorporated by reference and is described below with reference to FIG. 4B.

Similarly, external audio sources are used to provide audio input to the personal computer 300. A microphone 352 and CD player 354 are shown as the external audio sources, although any audio source may be used. Audio is coupled from the external audio sources 352, 354 to the host process using an audio card 350.

The connection from the host to the network is made using a Network Interface Card (NIC) 360. The NIC 360 is an Ethernet card, but may be substituted with, for example, a telephone modem, a cable modem, a wireless modem or any other network interface.

Figure 4A:
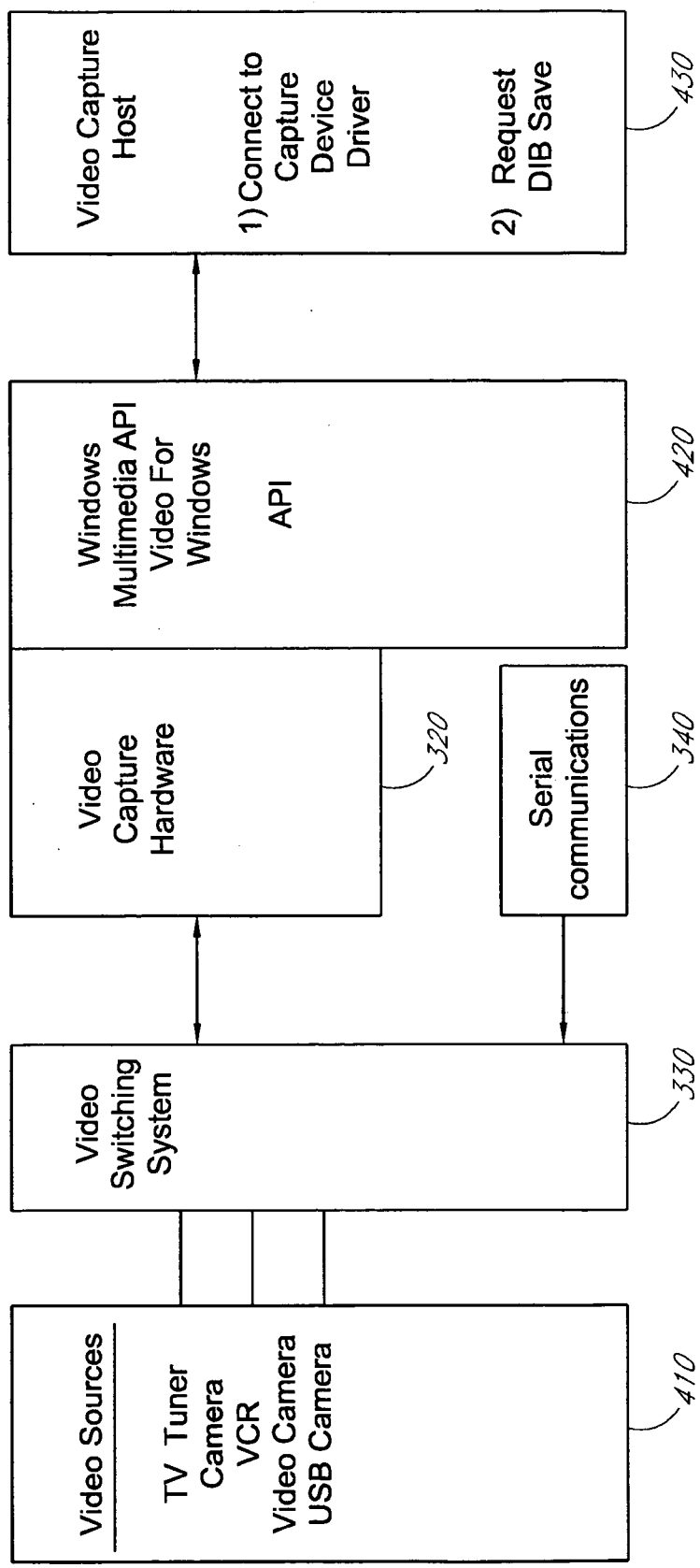
FIG. 4A is a diagram illustrating the video capture module.

FIG. 4A is a diagram illustrating a process for video capture using an apparatus such as that shown in FIG. 3. A video signal is generated in at least one video source 410. One video source may be used or a plurality of video sources may be used. A video switching system 330 is used when a plurality of video sources 410 is present. Each video source is connected to an input port of the video switching system 330. The video switching system 330 routes one of the plurality of input video signals to the video capture hardware 320 depending on the control settings provided to the video switching system 330 through a serial communications 340 link from the switcher 44 (see FIG. 1).

Video sources such as a VCR, TV tuner, or video camera generate composite video signals. The video capture hardware 320 captures a single video frame and digitizes it when the video switching system 330 routes a video source outputting composite video signals to the video capture hardware 320. The system captures an image using an Application Program Interface (API) 420, such as Video for Windows available from Microsoft Corp. The API transmits the captured image to the video capture module 430.

Figure 4B:
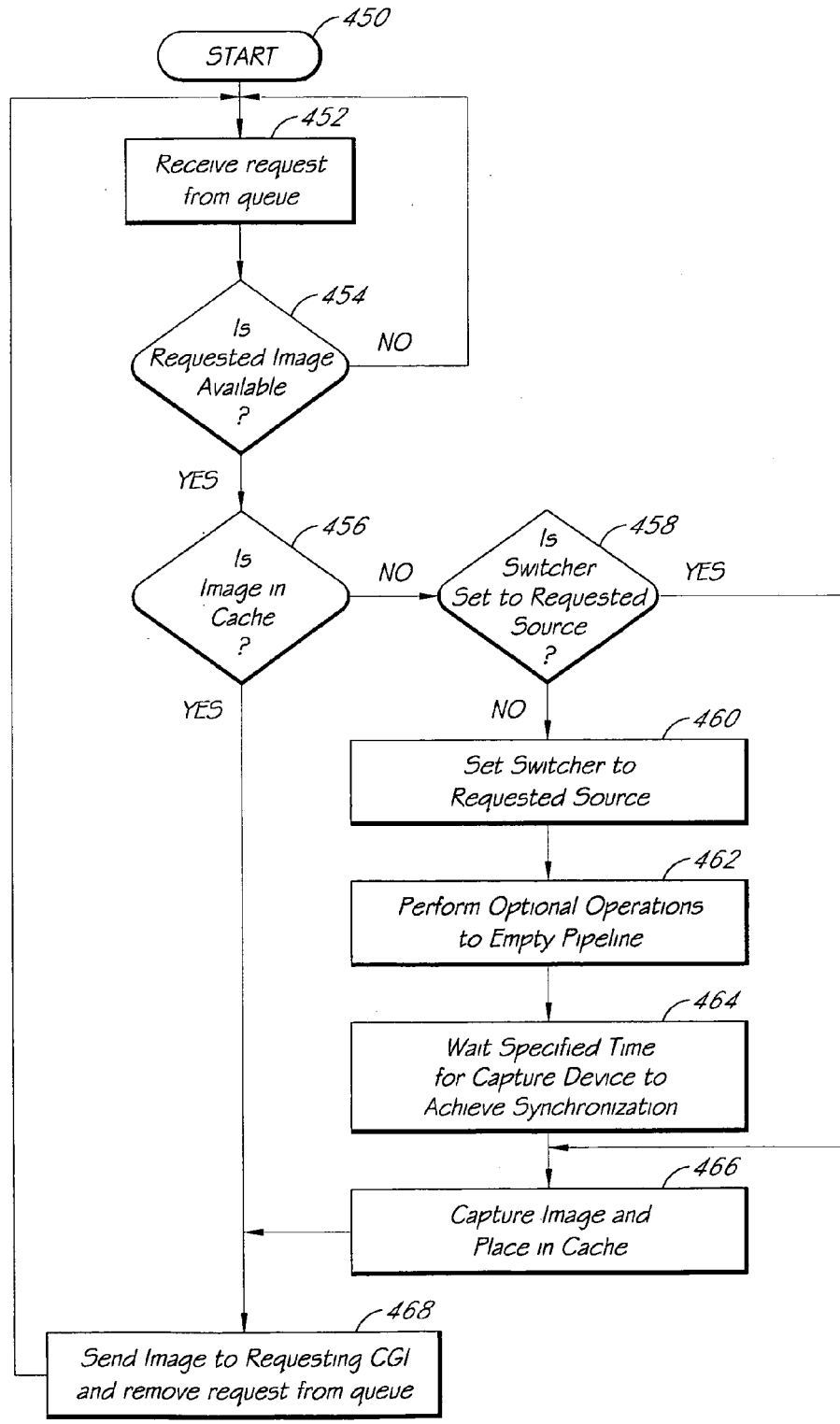
FIG. 4B is a flow chart illustrating the function of the switching system.

FIG. 4B is a flow chart illustrating the function of the video switching module 330 shown in FIGS. 3 and 4A. The video subsystem maintains a cache of time stamped, video images for each video-input source. Requests for data are placed on a queue in the serial communications module 340. When the video switching module 330 receives a request from the queue (step 452), it first determines whether the requested image is available (step 454). The requested image may be unavailable if, for example, the image is in the process of being captured. If the image is not available, the process returns to step 452 and attempts to process the request again at step 454. If the requested image is available, the switching module 330 determines whether the image already exists in the cache (step 456). If the image exists in the cache, the switching module 330 sends the image to the requesting CGI 52*a*, 52*b* (see FIG. 1) and removes the request from the queue (step 468). If the image does not exist in the cache, the switching module 330 proceeds to obtain the image. First, it determines whether the switcher is set to the source of the requested image (step 458). If the switcher is set to the proper source, the image is captured and placed in the cache (step 466). The image is then sent to the requesting CGI and the request is removed from the CGI (step 468). If the switcher is not set to the proper source, the switching module 330 causes a command to be sent to the switcher to switch to the source of the requested image (460). Next, depending on the video source and the capture device, optional operations may be performed to empty pipelines in the capture device's hardware or driver implementation (step 462). This is determined via test and interaction with the device during installation. The switching module 330 then waits a predetermined length of time (step 464). This delay allows the video capture device to synchronize with the new video input stream. The requested image is then captured and placed in the cache (step 466). The image is then sent to the requesting CGI, and the request is removed from the queue (step 468). Once the request has been removed, the switching module 330 returns to the queue to process the next request. Although the above description relates to the switching of video inputs, it may also apply to any switching module including, for example, the multimedia switcher 44 illustrated in FIG. 1.

Audio signals are captured in a process (not shown) similar to video capture. Audio sources are connected to multimedia audio hardware in the personal computer. The audio capture module makes periodic requests through an API such as Windows Multimedia, available from Microsoft Corp., for audio samples and makes the data available as a continuous audio stream.

The host 10 (see FIG. 1) distributes the multimedia data to requesting clients once the multimedia data has been captured. As noted above, the host is configured as a web server 50 in order to allow connections by numerous clients runs the host multimedia distribution application.

The client 30 can be a remote hardware system that is also connected to the network. The client may be configured to run a Java-enabled browser. The term "browser" is used to indicate an application that provides a user interface to the network, particularly if the network is the World Wide Web. The browser allows the user to look at and interact with the information provided on the World Wide Web. A variety of commercially available browsers are available for computers. Similarly, compact browsers are available for use in portable devices such as wireless phones and personal digital assistants. The features available in the browser may be limited by the available processing, memory, and display capabilities of the hardware device running the browser.

Java is a programming language developed especially for writing client/server and networked applications. A Java applet is commonly sent to users connected to a particular web site. The Java archive, or Jar, format represents a compressed format for sending Java applets. In a Jar file, instructions contained in the Java applet are compressed to enable faster delivery across a network connection. A client running a Java-enabled browser can connect to the server and request multimedia images.

Wireless devices may implement browsers using the Wireless Application Protocol (WAP) or other wireless modes. WAP is a specification for a set of communication protocols to standardize the way that wireless devices, such as wireless phones and radio transceivers, are used for Internet access.

Figure 5A:
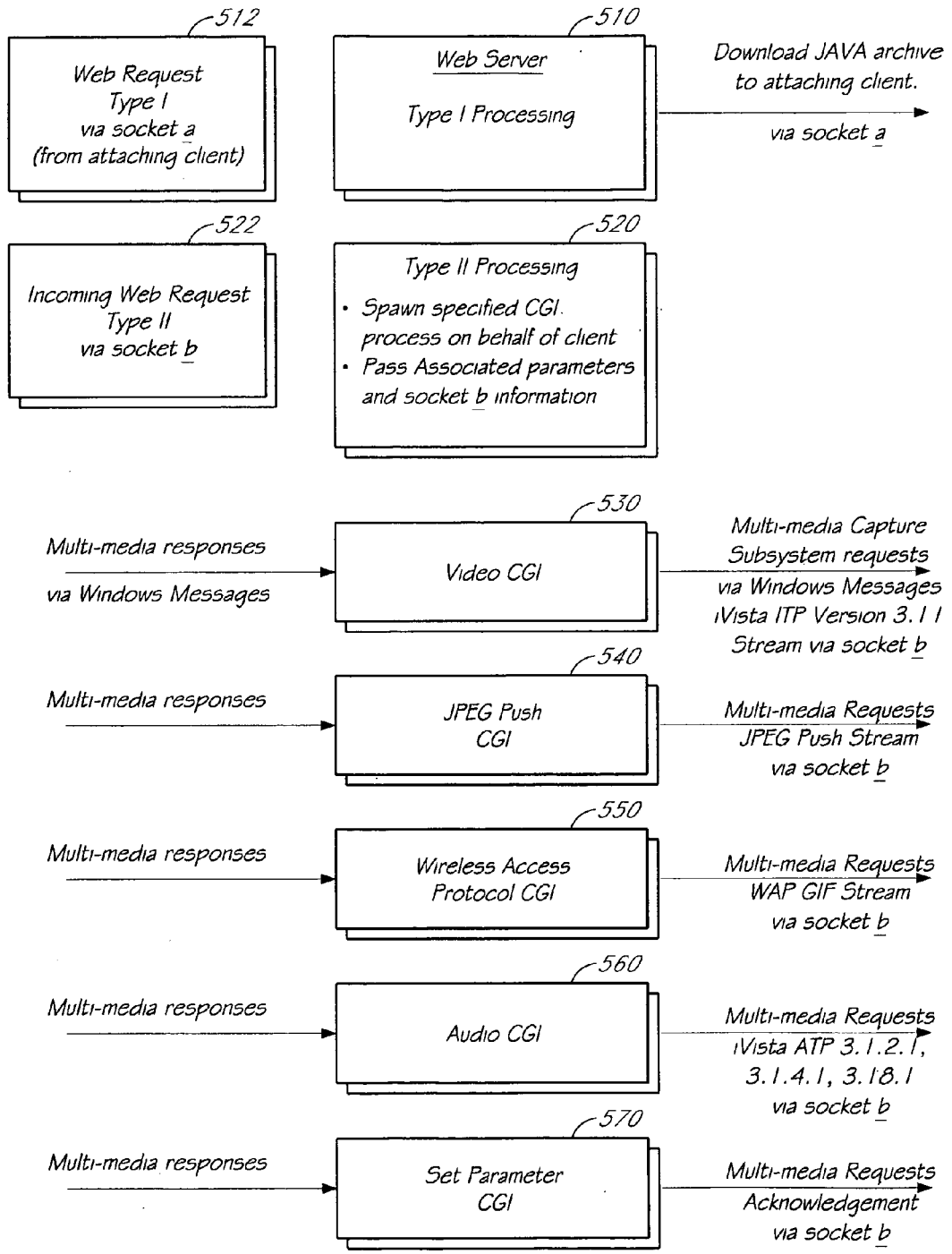
FIG. 5A is a block diagram of a multimedia distribution module wherein the host operates as a server.

Referring to FIGS. 1 and 5A, a client 30 initially connecting via the network 20 to the host makes a web request, or Type I request 512, while logged on a website. As used herein, the term "website" refers to one or more interrelated web page files and other files and programs on one or more web servers. The files and programs are accessible over a computer network, such as the Internet, by sending a hypertext transfer protocol (HTTP) request specifying a uniform resource locator (URL) that identifies the location of one of the web page files. The files and programs may be owned, managed or authorized by a single business entity or an individual. Such files and programs can include, for example, hypertext markup language (HTML) files, common gateway interface (CGI) files, and Java applications.

As used herein, a "web page" comprises that which is presented by a standard web browser in response to an HTTP request specifying the URL by which the web page file is identified. A web page can include, for example, text, images, sound, video, and animation.

The server performs Type I processing 510 in response to the Type I request 512 from the client. In Type I processing, the server opens a communication socket, designated socket "a" in FIG. 5A, and sends a Jar to the client. The first communication socket, socket "a," is closed once the Jar is sent to the client. The client then extracts the Jar and runs it as a video applet once the entire Jar arrives at the client system. Alternatively, the functionality of the video applet can be implemented by software or firmware at the client.

The video applet running on the client system makes a request to the server running on the host. The request specifies parameters necessary for activation of a Common Gateway Interface (CGI) necessary for multimedia distribution. The video applet request may supply CGI parameters for video source selection, frame rate, compression level, image resolution, image brightness, image contrast, image view, and other client configurable parameters. The specific parameters included in the request can be determined by which button or link was selected as part of the Type I request. The web page may offer a separate button or link for each of several classes of clients. These classes refer to the capability of clients to receive data in specific formats and at specific rates. For example, one button may correspond to a request for the data at a high video stream rate (30 frames per second) while another button corresponds to a request for the data in simple JPEG (single frame) format. Alternatively, the video applet can survey the capabilities of the client system and select appropriate parameters based upon the results of the survey, or the video applet can respond to user input.

The server receives the video applet request and, in response, establishes a communication port, denoted socket "b," between the server and the client. The server then launches a CGI using the parameters supplied by the video applet request and provides client access on socket "b." The video CGI 530 established for the client then sends the formatted video image stream over the socket "b" connection to the video applet running on the client. The video applet running on the client receives the video images and produces images displayed at the client.

The applet may be configured to perform a traffic control function. For example, the client may have requested a high stream rate (e.g., 30 frames per second) but may be capable of processing or receiving only a lower rate (e.g., 10 frames per second). This reduced capability may be due, for example, to network transmission delays or to other applications running on the client requiring more system resources. Once a transmission buffer memory is filled, the server is unable to write further data. When the applet detects this backup, it submits a request to the server for a reduced stream rate. This request for change is submitted via, for example, a "set parameter" CGI 570, or a frame rate CGI, which is described in further detail below with reference to FIG. 5B.

To detect a backup, the applet can compare a timestamp embedded in each frame (described below with reference to FIG. 6) with the client's internal clock, for example. By detecting a change in the relative time between consecutive frames, the applet is able to recognize the backup and skip processing of delayed frames. Thus, the client proceeds to process the current frame rather than an old frame. For example, if the client receives 30 frames per second and can only process one frame per second, the applet will cause the client to process the first frame, skip the next 29 frames and process the 31st frame.

The client can also select to view only a portion of the image. For example, the client may select a region of the image that he wishes to magnify. The applet allows the client to submit a request to the CGI to transmit only blocks corresponding to the selected region. By selecting only the selected blocks, the necessary bandwidth for transmission is further reduced. Thus, the client can zoom to any region of the captured image. As a further example, the client may submit a request, via the applet, to pan across the image in any direction, limited only by the boundaries of the captured image. The applet submits this request as a change in the requested region.

Each time a video frame or audio block is encoded in the server, it is available to be transmitted to the client. The video CGI 530 determines, according to the parameters passed by the video applet, whether to submit a request for an additional video frame and whether to send the additional information to the client.

A similar audio CGI 560 is established using an audio applet running on the client. Each time an audio block is encoded at the server, it is available to be transmitted to the client. The audio CGI 560 transmits the audio information to the client as a continuous stream.

The applet may be configured to perform an audio traffic control function similar to that described above with respect to the video CGI 530. For example, the client may have initially requested an 8-bit audio stream but may be capable of only handling a 4-bit or a 2-bit stream.

2-bit and 4-bit audio streams are encoded based on adaptive pulse code modulation encoding (ADPCM) as described by Dialogic Corporation. The 4-bit audio samples are generated from 16-bit audio samples at a fixed rate. The 2-bit audio encoder modifies the standard ADPCM by removing the two lowest step bits, resulting in 2-bit samples from the original 16-bit data. An 8-bit stream is generated by converting 16-bit samples into 8-bits using a μ-law encoder which is utilized in the Sun Microsystems, Inc. audio file format. This encoder is defined as the ITU-T standard G.711.

When the applet detects a discrepancy between the transmitted audio data and the capabilities of the client, it submits a request for change to the server. The audio CGI 560 then closes the audio stream and reopens it at the appropriate data rate.

As noted above, the client determines the type of CGI that controls the information flowing to it on socket b by making the appropriate request. In the case of a JPEG Push CGI 540 or a Wireless Access Protocol (WAP) CGI 550, no applet is involved and no socket "b" is established. For example, if the client is an Internet-enabled wireless device utilizing a WAP browser, a video CGI 530 is not set up. Instead, a WAP-enabled device requests a WAP CGI 550 to be set up at the server. Video frames are then routed to the WAP-enabled device using the WAP CGI in lieu of the video CGI 530 via socket "a". The video frames are routed to the client as JPEG files. Similarly, a JPEG Push CGI 540 is set up at the server if the client requests JPEG Push. In response to a request by a client, the web server 510 establishes a separate socket b connection to the server and utilizes a separate CGI that is appropriate for its capabilities, for that particular client.

An additional CGI that utilizes a socket is the "set parameter" CGI 570. A client may revise the parameters that control the received images and audio by adjusting controls that are available on the video applet. When the client requests a change in parameters the "set parameter" CGI 570 is launched to change the parameters at the server. It can be seen that each individual client may change the CGI settings associated with that particular client without affecting the images or audio being sent to any other client. Thus, each individual client has control over its received multimedia without affecting the capture process running on the server system.

Figure 5B:
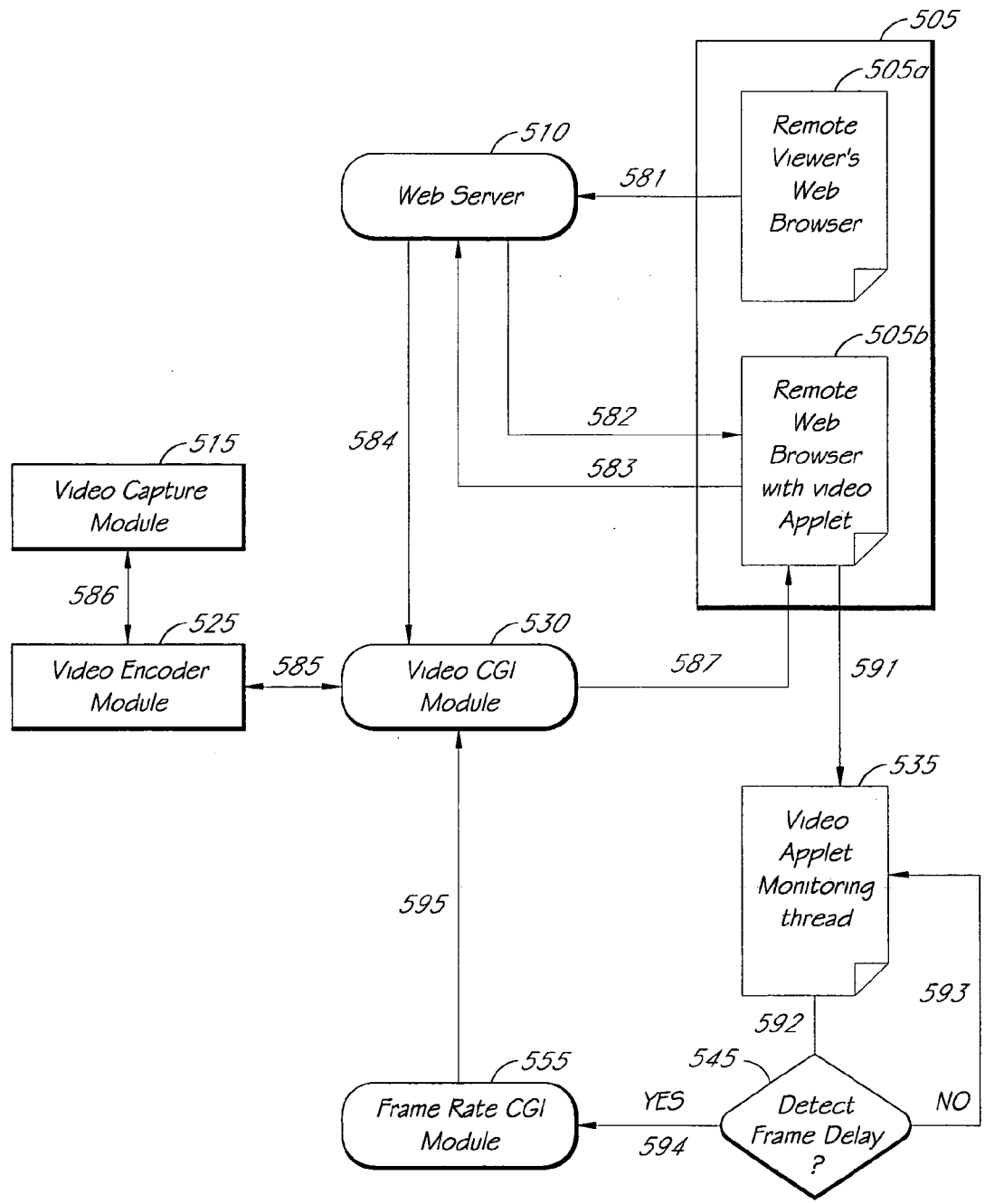
FIG. 5B is a block diagram illustrating the broadcast of video data by a web server.

FIG. 5B is a block diagram illustrating the streaming of the video data by the host to clients and the flow of commands and information between components of the host and the client. The video streaming begins when the client, via the remote user's web browser 505a, sends a request (indicated by line 581) to the host server system 510. In one embodiment, the request is an HTTP request. In response to the request, the server system 510 sends (line 582) a Jar to the client's web browser 505. The Jar includes an applet that is launched by the client's web browser 505. Although FIG. 5B indicates the web browser 505 as having two blocks 505a, 505b, it is understood that the two blocks 505a, 505b only illustrate the same browser before and after the launching of the applet, respectively. Among other functions, the applet then sends a request to the web server 510 for the web server 510 to launch a CGI (line 583). Additionally, the applet causes the client to send client-specific parameters to the web server 510. In response to the request, the web server 510 establishes a socket and launches a CGI 530 according to the parameters supplied by the client and information associated with the socket (line 584). The CGI 530 submits periodic requests for video information to a video encoder 525 (line 585). The video encoder 525 receives JPEG-encoded video data from a video capture module 515 and formats the data for streaming as described, for example, below with reference to FIGS. 6 and 7 (line 586). The encoder 525 responds to the requests from the CGI 530 by transmitting the encoded video information to the CGI 530 (line 585). The video encoder module 525 and the video CGI module 530 may be sub-modules in the video CGI 52a shown in FIG. 1. The CGI 530 transmits the encoded video frames to the applet over the established socket (line 587). The applet decodes the encoded audio frames, providing audio to the user.

As noted above, the applet may be configured to perform a traffic control function. When the applet is launched on the remote viewer's browser 505b, it launches a frame-rate monitoring thread 535 (line 591). The thread 535 monitors the video stream for frame delays (step 545) by, for example, comparing time stamps of video frames with the client's internal clock, as described above. As indicated in FIG. 5B, the video applet continuously checks for frame delays (line 593). When a frame delay is detected (line 594), the applet requests that the web server 510 launch a frame-rate CGI 555. The request also submits parameters to indicate the frame rate capabilities of the client. The parameters are submitted to the video CGI 530 (line 595) which changes the rate at which video is streamed to the user.

The video CGI compresses and formats the video images for streaming in order to reduce the required network bandwidth. The video applet running on the client extracts the video image from the compressed and encoded data. A block diagram of the video stream format is shown in FIG. 6. The video stream can be formatted in several ways with each format transmitting separate video image information. All video stream formats are comprised of a single six-byte header 602 followed by a number of video blocks 604a–604nn.

The six-block header 602 is made up of a one-byte error code 610, a one-byte source 612, and a four-byte connection ID 614. The one-byte error code 610 indicates whether an error is present in the transmission. A zero value error code 610 indicates a successful transmission follows. A non-zero error code indicates an error has been detected and no data blocks will follow. The non-zero error code 610, therefore, indicates the data stream is complete. The one-byte source 612 indicates the origin of the video image. A zero value source 612 indicates the host as the source of the video image. A one in the source 612 indicates the image is coming from a mirror site. The use of a mirror site is discussed in detail below. Use of a mirror site is not otherwise detectable by the client and does not degrade the image received at the client. The four-byte connection ID 614 is used to designate the specific client. The connection ID 614 is an identifier that is unique to each connected user.

A series of video blocks 604 follow the header 602. Different video block formats are used to transmit different size video images. However, all video block formats utilize a structure having a four-byte frame size field 620 followed by a four-byte block type field 622, followed by block data fields 624.

A first type of video block 604 is defined as block type N, where N represents a positive integer defining the number of image segments encoded in the block. A block type N format utilizes a data triplet to define each of N video segments. Each of the N data triplets contains a four-byte X position field 632, a four-byte Y position field 634, and a four-byte width field 636. The X and Y positions define the location of the segment on the client screen. The width field 636 defines the width of the video segment. The height of the video segment for the block type N video format is preset at sixteen pixels. Thus, each of the data triplets defines a video stripe image that is displayed on the client screen. Following the N data triplets, the block type N video format utilizes a series of data blocks. A four-byte data offset field 640 is used to facilitate faster transmission of data by not transmitting identical bytes of data at the beginning of each image. For example, two consecutive images may have the identical first 600 bytes of data. The data offset field 640 will be set to 600 and will prevent retransmission of those 600 bytes.

A Data Size (DS) field 642 follows the data offset field 640 and is used to define the size of the data field that follows. Two four-byte timestamp fields 644, 646 follow the DS field 642. The first timestamp field 644 is used to timestamp the video image contained in the block type N image. The timestamp 644 may be used to update a timestamp that is displayed at the client. The second timestamp field 646 is used to synchronize the video stream with an audio stream. The contents of the DS field 642 define the number of data bytes in the data field 648 that follows the timestamp fields 644 and 646. The information in the data field 648 is JPEG encoded to compress the video image. Thus, each data triplet defines the location and width of a JPEG encoded video image stripe. The image is a single video stripe in the image when all of the segments are in the same Y coordinate. The initial segment 650a is a sixteen-pixel-high segment having a width defined in the first data triplet. Similarly, subsequent segments 650b–650n are sixteen-pixel-high segments with widths defined by the width field 636b–636n of the corresponding triplet.

Another video block type is denoted block type −3 and is also known as a Single Block type. The structure of the Single Block is shown in FIG. 7. The Single Block format begins with a pair of four-byte data fields. The first four-byte data field provides the initial horizontal location, $X_0$ 710. The second four-byte block provides the initial vertical location, $Y_0$ 712. The coordinates $X_0$ 710 and $Y_0$ 712 define the upper left corner of the video image provided in the Single Block. A second pair of four-byte data fields follows the first pair. The second pair of data fields defines the lower right corner of the video image provided in the Single Block. The first data field in the second pair provides the final horizontal position, $X_1$ 714, and the second data field in the pair provides the final vertical position, $Y_1$ 716. A four-byte Data Offset field 718 follows the two pairs of coordinates. A Data Size (DS) field 720 follows the Data Offset field 718 and is used to define the number of bytes in the data field 726. Immediately following the DS field 720 are two four-byte timestamp fields 722 and 724 to identify the time the video image was generated. The video applet running on the client can extract the timestamp information in order to overlay a timestamp on the image. The Single Block is completed with a data field 726 consisting of the number of data blocks defined in the DS field 720. Thus, the Single Block type defines a rectangular video image spanning the coordinates $(X_0, Y_0)$–$(X_1, Y_1)$.

Block type −4, also designated a Synchronization Frame, has a data format identical to that of the above-described Single Block. In the Synchronization Frame, the initial horizontal and vertical coordinates, $X_0$ and $Y_0$, are set to zero. Setting the initial coordinates to zero aligns the upper left corner of the new image with the upper left corner of the existing image. The final horizontal and vertical coordinates in the Synchronization Frame correspond to the width of the whole image and the height of the whole image, respectively. Therefore, it can be seen that the Synchronization Frame can be used to refresh the entire image displayed at the client. The Synchronization Frame is used during the dynamic update of the video frame rate in order to limit transmission delays, as described above with reference to FIG. 5B.

Block type −1 does not contain any image data within it. Rather it is used to indicate a change in the transmitted image size. The block type −1 format consists of a four-byte data field containing the New Width 740, followed by a four-byte data field containing the New Height 742. The block type −1 information must be immediately followed by a full-image Single Block or Synchronization Frame.

Finally, block type −2 is designated the Error Block. The Error Block consists solely of a one-byte Error Code 750. The Error Block is used to indicate an error in the video stream. Transmission of the video stream is terminated following the Error Code 750.

Referring now to FIG. 8, motion detection which can be carried out by the host will be described. Once the image has been captured into a JPEG-encoded frame, for example, the contents of a frame can further be processed by the main program module 46 (see FIG. 1) as follows. Data from subsequent video frames can be compared to determine whether the frames capture motion. FIG. 8 shows a flow chart of the motion detection process. A JPEG-encoded frame is received from the video capture module 40a by the main program module 46 (see FIG. 1). The frame is first subdivided into a grid of, for example, 16 blocks by 16 blocks in order to detect motion within sequential images (step 802). Motion can be detected in each individual block. The number of blocks used to subdivide the frame is determined by the precision with which motion detection is desired. A large number of blocks per frame increases the granularity and allows for fine motion detection but comes at a cost of processing time and increased false detection of motion due to, for example, jitter in the image created by the camera or minute changes in lighting. In contrast, a lower number of blocks per frame provides decreased resolution but allows fast image processing. Additionally, the frame may be the complete image transmitted to the clients or may be a subset of the complete image. In other words, motion detection may be performed on only a specific portion of the image. The host user may determine the size and placement of this portion within the complete image, or it may be predetermined.

Once the frame has been subdivided, each block in the grid is motion processed (referenced in FIG. 8 as 810). Motion processing is performed on each block using comparisons of the present image with the previous image. First, at step 812, a cross-correlation between the block being processed of the current image and the corresponding block of the previous image is calculated. In one embodiment, the cross-correlation includes converting the captured blocks to grayscale and using the gray values of each pixel as the cross-correlated variable. Alternatively, the variable used for cross-correlation may be related to other aspects of the image such as light frequency of pixels.

At step 814, the cross-correlation is then compared with a predetermined threshold. The predetermined cross-correlation threshold can be a static value used in the motion detection process or it can be dynamic. If the cross-correlation threshold is dynamic, it may be derived from the size of the blocks or may be set by the host user. The host user may set the cross-correlation threshold on a relative scale where the scale is relative to a range of acceptable cross-correlation values. Use of a relative scale allows the host user to set a cross-correlation threshold without having any knowledge of cross-correlation. It may be preferable for the cross-correlation threshold to be set higher when the block size is large. In contrast, a lower cross-correlation threshold may be preferable where the block size is small and there are not many pixels defining the block. In addition, the cross-correlation threshold can be set in accordance with the environment in which the system operates (e.g., outdoor versus indoor) and the particular use of the motion detection (e.g., detecting fast movement of large objects).

If, at step 814, the cross-correlation threshold is not exceeded (i.e., the blocks are sufficiently different), the process next calculates the variance in the brightness of the block over the corresponding block of the previous image (step 816). The variance is compared against a variance threshold at step 818. Again, the variance threshold may be static or dynamically determined. If the calculated variance falls below the variance threshold then no motion is indicated in the block, and the process continues to step 890. The block is not marked as one having motion. However, if the variance exceeds the variance threshold, the block is marked as having motion at step 820, and the process continues to step 890.

On the other hand, if the calculated cross-correlation is above the predetermined threshold at step 814 (i.e., blocks are sufficiently similar), then no motion has been detected, and the process continues to step 890. The block is not marked as one having motion. In an alternate embodiment, the brightness variance may be calculated and compared to a variance threshold. Thus, brightness variances alone may be sufficient to detect motion. However, to reduce the number of false positives, the preferred embodiment illustrated in FIG. 8 requires both a sufficient variance in brightness and in the cross-correlation variable.

At step 890, the routine checks to see if all blocks have been processed. If all blocks have been processed, the motion detection routine in the main program 46 terminates (step 899) and returns the results to the video capture module 40*a* shown in FIG. 1. However, if not all blocks of the current image have been processed, the routine returns to motion processing (reference 810) to analyze the next block.

Figure 9:
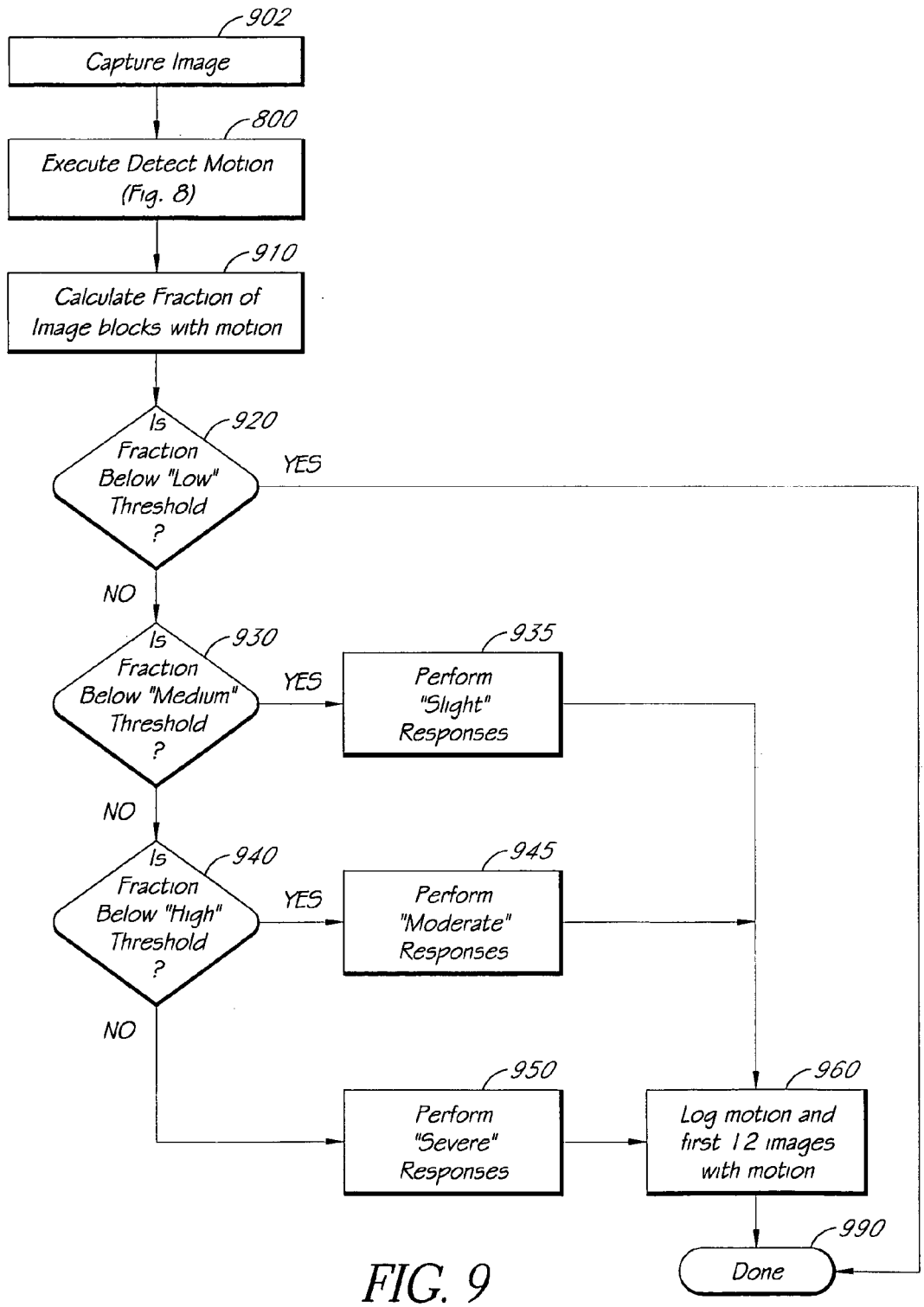
FIG. 9 is a flow chart illustrating motion detection at a frame level.
Figure 10:
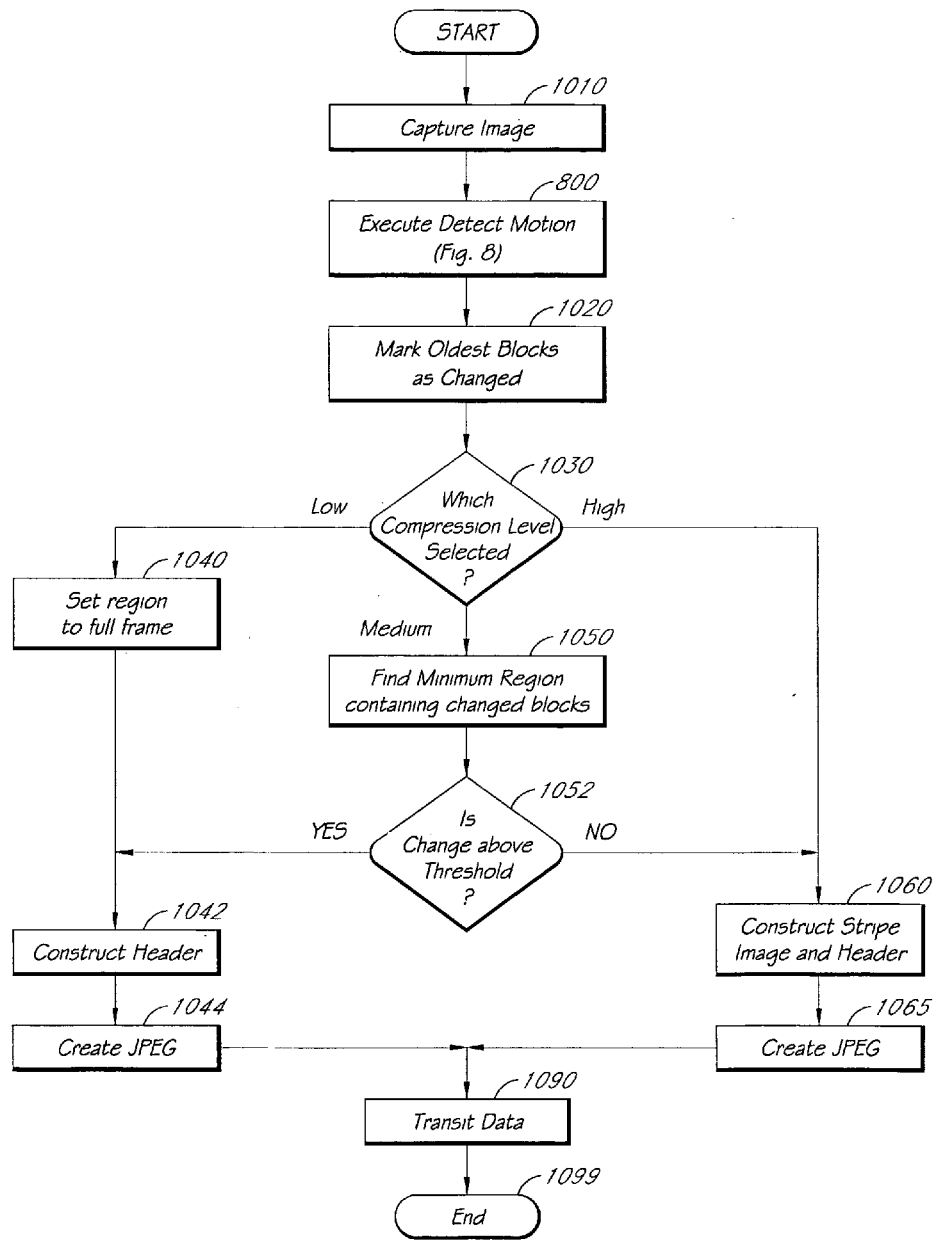
FIG. 10 is a flow chart illustrating a method of transmitting only those video image blocks that change.

FIG. 9 shows a flow chart of the motion detection process performed by the main program 46 (see FIG. 1) on a frame level. Motion detection requires comparison of at least two frames, one of which is used as a reference frame. Initially, a first frame is captured and used as the reference frame for determining motion detection (step not shown in FIG. 9). The first step in detecting motion is capture of the current frame (step 902). Motion detection (step 800) on the block level, as described above with reference to FIG. 8, is performed on the captured frame using the initial frame as the reference. Following motion detection on the block level (step 800), the motion detection process calculates the fraction of blocks that have motion (step 910). The calculated fraction is compared against "low," "medium," and "high" thresholds. The thresholds may be static or dynamic as described above for the thresholds in the block motion detection process (step 800).

If, at step 920, the calculated fraction falls below the "low" threshold, then no motion has been detected in the frame, and the detection process proceeds to step 990. However, if the calculated fraction exceeds the lowest threshold then the fraction must lie within one of three other ranges, and the process continues to step 930.

At step 930, the calculated fraction is compared against the "medium" threshold. If the calculated fraction does not exceed the "medium" threshold (i.e., the fraction is in the low-medium range), the process continues to step 935. At step 935, the motion detection process performs "slight" responses. Slight responses may include transmitting a first email notification to an address determined by the host user, sounding an audible alert, originating a phone call to a first number determined by the host user, or initiating predetermined control of external hardware, such as alarms, sprinklers, or lights. Any programmable response may be associated with the slight responses, although advantageously, the lowest level of response is associated with the slight response. After performing the "slight" responses, the process continues to step 960.

If, at step 930, the calculated fraction exceeds the "medium" threshold, the process continues to step 940. At step 940, the calculated fraction is compared against the "high" threshold. If the calculated fraction does not exceed the "high" threshold (i.e., the fraction is in the medium-high range), the process continues to step 945. At step 945, the motion detection process performs moderate responses. Moderate responses may include any of the responses that are included in the slight responses. Advantageously, the moderate responses are associated with a higher level of response. A second email message may be transmitted indicating the detected motion lies within the second range, or a second predetermined phone message may be directed to a phone number determined by the host user. After performing the "moderate" responses, the process continues to step 960.

If, at step 940, the calculated fraction exceeds the "high" threshold (i.e., the fraction is in the high range), the process continues to step 950. At step 950, the motion detection process performs severe responses. Advantageously, the most extreme actions are associated with severe responses. The severe responses may include transmitting a third email message to a predetermined address, originating a phone call with a "severe" message to a predetermined phone number, originating a phone call to a predetermined emergency phone number, or controlling external hardware associated with severe responses. External hardware may include fire sprinklers, sirens, alarms, or emergency lights. After performing the "severe" responses, the process continues to step 960.

At step 960, the motion detection process logs the motion and the first twelve images having motion regardless of the type of response performed. The motion detection threshold is, in this manner, used as a trigger for the recording of images relating to the motion-triggering event. The images are time-stamped and correlate the motion triggering event with a time frame. Motion detection using this logging scheme is advantageously used in security systems or any system requiring image logging in conjunction with motion detection. The motion detection process is done 940 once the twelve motion images are recorded. The motion detection process may be part of a larger process such that the motion detection process repeats indefinitely. Alternatively, the motion detection process may run on a scheduled basis as determined by another process. Although the foregoing example utilizes low, medium and high thresholds, fewer or more thresholds can be used.

Additional advantages may be realized using block motion detection in conjunction with the different image encoding formats shown in FIG. 6 and FIG. 7. Transmitting a complete video image to a client requires a great deal of network bandwidth even though the image may be JPEG-encoded. The amount of network bandwidth required to transmit images to a client can be reduced by recognizing that subsequent data within an image remains the same for a majority of images. Only a small fraction of the image may include data not previously transmitted to the client in a previous image. The network bandwidth requirement can be reduced by transmitting only those images that change from image frame to image frame. The client is not aware that the entire image is not retransmitted each time because those blocks that are not retransmitted contain no new information.

A process for conserving network bandwidth by transmitting only changed image blocks is performed by the video CGI 52*a* (see FIG. 1) and is shown in FIG. 110. The process begins by capturing an image (step 1010). The process then performs block motion detection 800 as described above with reference to FIG. 8. Additionally, at step 1020, the oldest blocks in the image, those unchanged after a predetermined number of image capture cycles, are marked as having changed even though they may remain the same. Marking the oldest blocks as having changed allows the image at the client to be refreshed over a period of time even though there may be no new information in the image frame. At step 1030, the route the process takes diverges depending on a chosen compression level. The level of compression may be preselected by the host. Alternatively, the host may offer the client a choice of compression levels. If low compression is selected, the process continues to step 1040, and the image to be transmitted to the client is set to the full image frame. The process then constructs the appropriate header (step 1042) and creates the JPEG image for the full image frame (step 1044). The process then proceeds to step 1090.

When medium compression is selected at step 1030, the process first finds the minimum region containing changed blocks (step 1050). The fraction of changed blocks in the minimum region is compared to a predetermined threshold at step 1052. If the fraction exceeds the predetermined threshold, the process constructs a header (step 1042), creates a JPEG image (step 1044), and proceeds to step 1090. On the other hand, if the fraction is less than the predetermined threshold at step 1052, the process continues to step 1060.

If high compression is selected at step 1030, the process continues to step 1060. At step 1060, the process constructs a header and stripe image for the changed blocks and the oldest unchanged blocks and proceeds to step 1065. At step 1065, the process creates a JPEG blocks for the stripe image and proceeds to step 1090. At step 1090, the data is transmitted to the client.

FIG. 11 is a block diagram of one format of an audio stream. The audio stream comprises a series of audio frames 1110 that are transmitted by the host in encoded form to the client. The encoding of an audio frame is described below with reference to FIG. 12. Additionally, the host also compresses the audio data to reduce the required bandwidth for transmission. Each audio frame 1110 has a header 1120 followed by eight blocks 1121–1128 of encoded audio data.

The header 1120 of each audio frame 1110 comprises five fields. The first is a host time field 1130. This four-byte field indicates the host clock time corresponding to the audio frame. The host time field 1130 allows the client to, for example, match the audio frame to the corresponding video frame. The second field in the frame header 1120 is a one-byte bit depth field 1132. The bit depth field 1132 is followed by a two-byte frame size field 1134. The frame size field 1134 communicates the length of the audio frame to the client. The last two fields in the frame header 1120 contain decoder variables that correspond to the method used to encode the audio frames. These fields include a two-byte LD field 1136 and a one-byte SD field 1138. The LD and SD fields 1136, 1138 are algorithm specific variables used with the 2-bit and 4-bit ADPCM audio encoders discussed above with reference to FIG. 5A.

Each block 1121–1128 in the audio frame 1110 contains a silence map 1140 and up to eight packets 1141–1148 of audio data. The silence map 1140 is a one-byte field. Each of eight silence bits in the silence map field 1140 corresponds to a packet of encoded audio data. The information in the silence bits indicates whether or not the corresponding packet exists in that block 1121–1128 of the audio frame 1110. For example, the silence map field 1140 may contain the following eight silence bits: 01010101, where 1 indicates a silent packet. This silence map field 1140 will be followed by only four packets of encoded audio data corresponding to silence map bits 1, 3, 5 and 7. If the corresponding packet does not exist (e.g., those corresponding to silence map bits 2, 4, 6 and 8 in the above example), the client will insert a silence packet with no audio data in its place. Thus, only packets with non-silent data must be transmitted, thereby reducing the required bandwidth. Each packet that is transmitted after the silence map 1140 consists of 32 samples of audio data.

Figure 12:
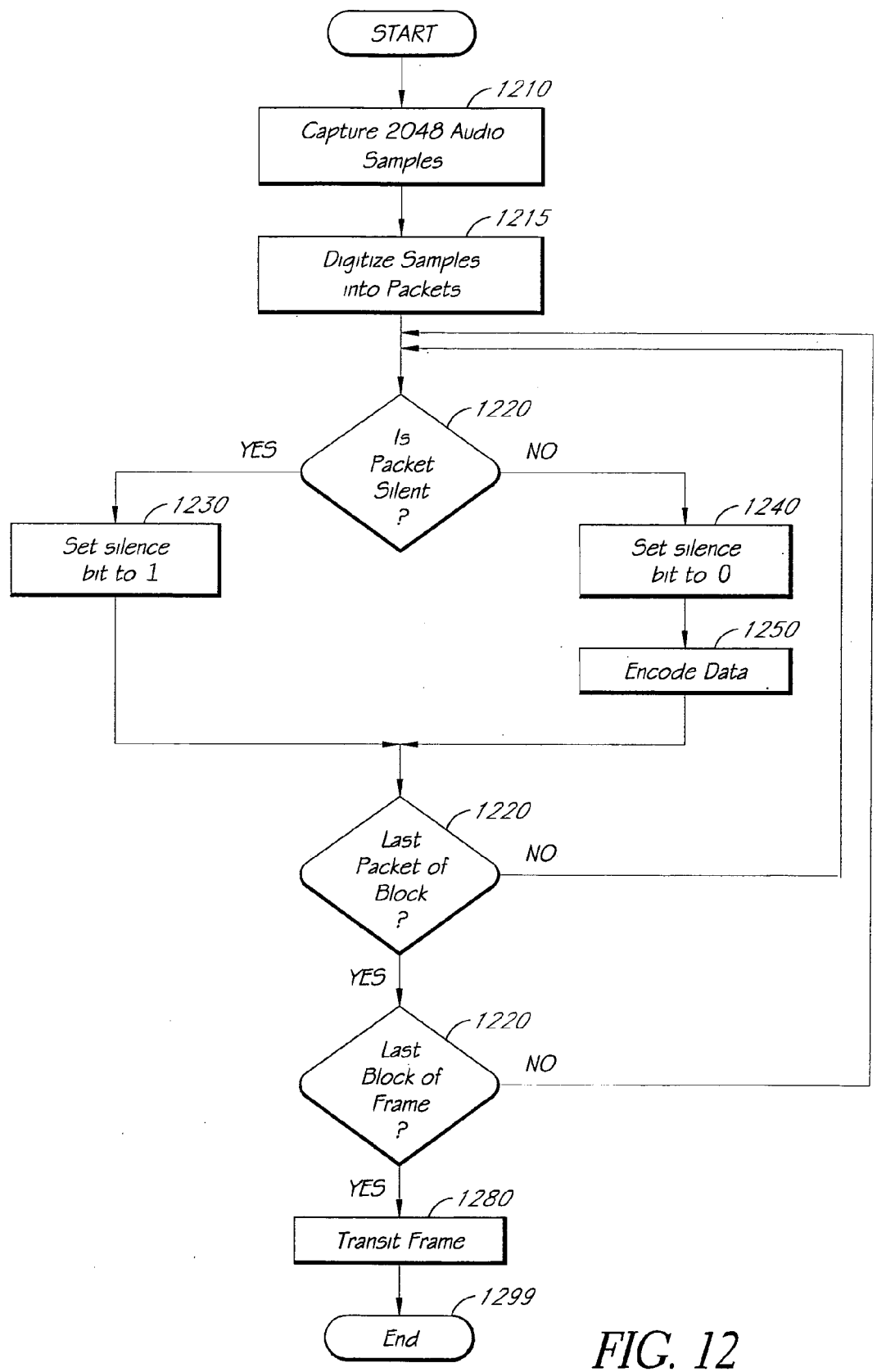
FIG. 12 is a flow chart illustrating the encoding and generation of an audio frame.

FIG. 12 is a flow chart illustrating the encoding and generation of the audio frame for transmission to the client. The encoding begins at step 1210 with the capture of 2048 audio samples from an audio source such as a microphone, CD player or other known sources. The samples are then digitized in packets of 32 samples each and groups the packets into blocks, each block containing eight packets (step 1215). A group of eight blocks then forms a frame. At step 1220, the audio CGI 52b (see FIG. 1) determines whether the current packet is silent. If the packet is silent, at step 1230, the silence bit in the silence map corresponding to the packet is set to 1. The data in the packet is not encoded, and the process continues to step 1260. If, on the other hand, the packet is not silent, the corresponding silence bit is set to 0 (step 1240), and the data in the packet is encoded (step 1250). The process then continues to step 1260.

After each packet is processed, the process determines whether the processed packet was the eighth and last packet of its block of data (step 1260). If the packet was not the last of its block, the process returns to step 1220 and processes the next packet of 32 samples. If the packet was the last of its block, the process writes the silence map and any non-silent packets into the block and proceeds to step 1270.

At step 1270, the process determines whether the preceding block was the eighth and last block of the audio frame. If the block was not the last of the frame, the process returns to step 1220 to begin processing the next block by processing the next packet of 32 samples. If the block was the last of the audio frame, the process writes the audio frame by writing the header and the eight blocks. At step 1280, the audio frame is transmitted to the client.

Figure 13:
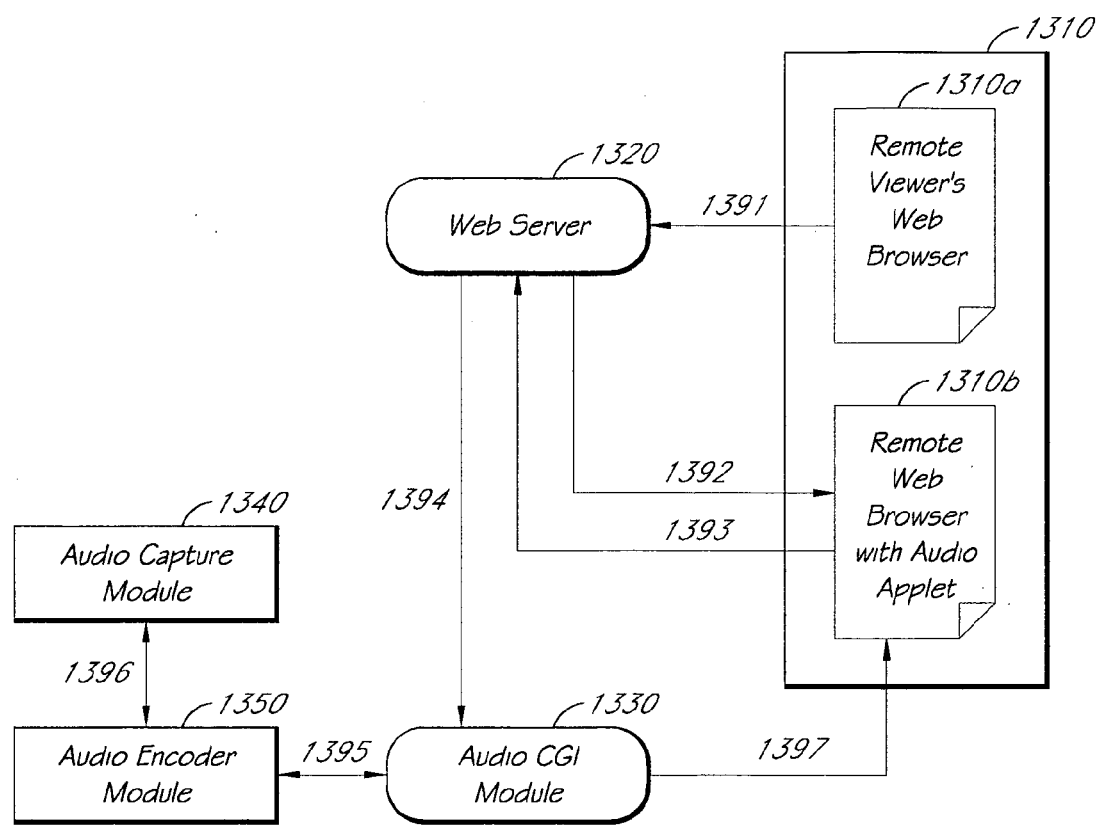
FIG. 13 is a block diagram illustrating the broadcast of audio data by a web server.

FIG. 13 is a block diagram illustrating the broadcast of the audio data by the host to clients and the flow of commands and information between components of the host and the client. The audio broadcast begins when the client, via the remote user's web browser 1310a, sends a request (indicated by line 1391) to the host server system 1320. In one embodiment, the request is an HTTP request. In response to the request, the server system 1320 sends (line 1392) a Jar to the client's web browser 1310. The Jar includes an applet that is launched by the client's web browser. Although FIG. 13 indicates the web browser 1310 as having two blocks 1310a, 1310b, it is understood that the two blocks 1310a, 1310b only illustrate the same browser before and after the launching of the applet, respectively. Among other functions, the applet then sends a request to the web server 1320 for the web server 1320 to launch a CGI (line 1393). Additionally, the applet causes the client to send client-specific parameters to the web server 1320. In response to the request, the web server 1320 establishes a socket and launches a CGI 1330 according to the parameters supplied by the client and information associated with the socket (line 1394). The CGI 1330 submits periodic requests for audio sample information to an audio encoder 1350 (line 1395). The audio encoder 1350 receives audio samples from an audio capture module 1340 and encodes the samples as described, for example, above with reference to FIG. 12 (line 1396). The encoder 1350 responds to the periodic requests from the CGI 1330 by making the encoded audio information available to the CGI 1330 via, for example, shared memory (line 1395). The audio encoder module 1350 audio CGI module 1330 may be sub-modules in the audio CGI 52b shown in FIG. 1. The CGI 1330 transmits the encoded audio frames to the applet over the established socket (line 1397). The applet decodes the encoded audio frames, providing audio to the user.

Figure 14:
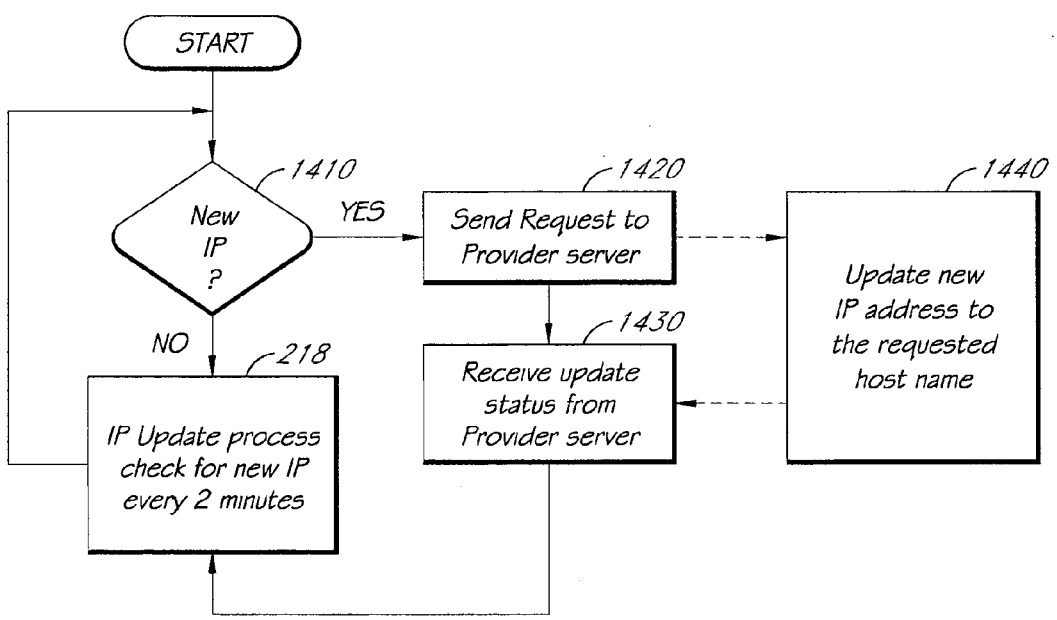
FIG. 14 is a flow chart illustrating the dynamic updating of the domain name system.

FIG. 14 is a flow chart of the function of the dynamic domain name system (DNS) updating process performed by the IP PROC module 60 illustrated in FIG. 1. The updating process begins when the host 10 (see FIG. 1) connects to a network 20 such as the Internet. When the host 10 connects to the network 20, it may be assigned a different Internet Protocol (IP) address from that which it was assigned during a previous connection. For example, the host 10 may connect to the Internet 20 through a service provider. The updating process, therefore, first checks to determine whether the current IP address is new (step 1410). If the IP address is unchanged, the process continues to step 1450. On the other hand, if the IP address is new, at step 1420, the process sends a request to a DNS host server 90 to update the IP address. The DNS host server 90 updates the IP address corresponding to the requesting host in its database or in a DNS interface 92 of service provider affiliated with the host 10 (step 1440). In response to the request, the process receives an update from the DNS host server 90 at step 1430. The process then proceeds to step 1450. The process is repeated at regular intervals, such as every 2 minutes, to keep the IP address in the DNS host server 90 updated. When a client 30 seeks to obtain data from a host 10, the client 30 is directed to the DNS host server 90 which uses the updated information to direct the client 30 to the proper host 10.

In a further embodiment, the host 10 may specify a schedule to the DNS host server 90. The schedule may indicate when the host 10 is connected to the network 20 and is available to clients 30. If the host 10 is not available, the DNS host server 90 can direct a client 30 to a web page providing the schedule and availability of the host 10 or other information. Alternatively, the DNS host server 90 can monitor when the host 10 is not connected to the network 20. When the host 10 is not connected to the network 20, the DNS host server 90 can direct a client 30 to a web page with an appropriate message or information.

Figure 15:
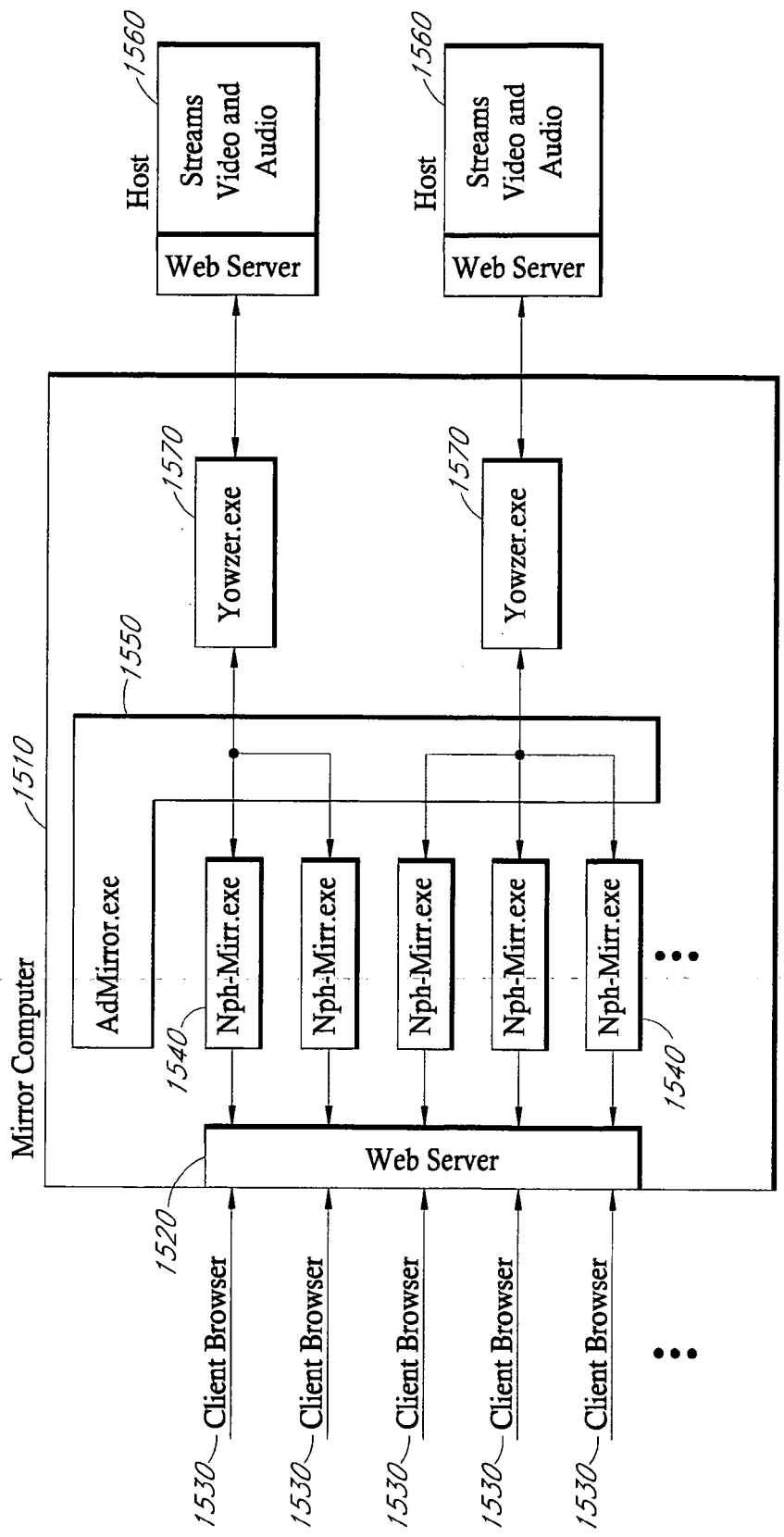
FIG. 15 is a block diagram of a system for mirroring audio and video data.

FIG. 15 is a block diagram of a system for mirroring audio and video data streamed by the host. A mirror computer 1510 is configured with a web server process 1520 to interface with clients 1530. In response to requests from clients 1530 made to the web server process 1520, the mirror computer 1510 launches a CGI process, nph-mirr 1540, for each requesting client 1530. An AdMirror process 1550 running on the mirror computer 1510 coordinates the mirroring of one or more host 1560. When a client 1530 makes a request to the web server 1520 for a specific host 1560, the nph-mirr process 1540 corresponding to that client 1530 causes the AdMirror process 1550 to launch a Yowzer process 1570 for the specific host 1560 requested by the client 1530. The Yowzer process 1570 coordinates the connection of the mirror computer 1510 to the host 1560 and the streaming of the video and audio data from the host 1560. If a Yowzer process 1570 already exists for the specific host 1560, as may happen if the specific host 1560 has been previously requested by another client 1530, an additional Yowzer process 1570 is not launched. The AdMirror process 1550 then causes the Yowzer process 1570 corresponding to the requested host 1560 to interface with the nph-mirr process 1540 corresponding to the requesting client 1530. Thus, a single Yowzer process 1570 may support multiple nph-mirr 1540 processes and their corresponding clients 1530.

Each nph-mirr process 1540 functions as, for example, the CGI 52 described above with reference to FIG. 1, and coordinates streaming of data from the host 1560 to the client 1530. Accordingly, the nph-mirr process 1540 sends an applet to the client 1530 and receives parameters related to the capabilities of the client 1530 and client's browser. Thus, the client 1530 receives streamed data at, for example, a frame rate that corresponds to its capability to process the frames.

Thus, while the host 1550 streams data to the mirror computer 1510, the mirror computer 1510 assumes the responsibility of streaming the data to each of the clients 1530. This frees the host 1550 to use its processing power for maintaining high video and audio stream rates. The mirror computer 1510 may be a dedicated, powerful processor capable of accommodating numerous clients 1530 and numerous hosts 1550.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of distributing media data to a client computer via a network from a host computer, comprising:
   receiving a data request at the host computer from a client computer via the network;
   launching a module on the client computer;
   receiving a client computer specific parameter from the module on the client computer;
   streaming media data to the client computer from the host computer via the network according to the client computer specific parameter; and
   detecting video motion, wherein said detecting is performed on a block level, by the process comprising:
   receiving a video image;
   subdividing the video image into a grid of blocks;
   processing every block from the grid of blocks according to the following:
   determining a cross correlation by comparing an individual block from a current grid of blocks with a corresponding individual block from a previous grid of blocks;
   if the cross correlation is below a predetermined correlation threshold level, then:
   calculating the variance in the brightness of the block over the corresponding block of the previous image;
   if the variance in the brightness is above a variance threshold, then marking the block as having motion;
   if the variance in the brightness is below the variance threshold, then marking the block as not having motion;
   if the cross correlation is above the predetermined threshold level, then marking the block as not having motion; and
   repeating the processing until video motion detection is determined for every block in the grid.

2. The method of distributing media data according to claim 1, wherein said client computer specific parameter comprises the processing capability of the client computer.

3. The method of distributing media data according to claim 2, wherein said streaming media data is at a rate compatible with the processing capability of the client computer.

4. The method of claim 3, wherein the media data stream is sent to the client computer while another media data stream is sent to another client at an independent rate.

5. The method of claim 1, wherein the client computer specific parameter is selected from the group consisting of video source selection, audio source selection, audio and video source selection, frame rate, compression level, image resolution, image brightness, image contrast, and image view.

6. The method of claim 1, wherein the client computer is selected from the group consisting of a microprocessor- or processor-controlled device or system that permits access to a network, including a terminal device, such as a personal computer, a workstation, a server, a client, a mini-computer, a main-frame computer, a laptop computer, a network of individual computers, a mobile computer, a palm-top computer, a hand-held computer, a set top box for a television, an interactive television, an interactive kiosk, a personal digital assistant, an interactive wireless communications device, and a mobile browser.

7. The method of claim 1, wherein the media data comprises audio data.

8. The method of claim 1 wherein the media data comprises video data.

9. The method of claim 1, wherein the media data comprises video and audio data.

10. The method of claim 1, further comprising:
launching a delay monitoring module on the client computer;
detecting a changed multimedia data stream transmission at the client computer;
sending a request via a network to a host computer requesting a changed multimedia data stream rate transmission;
sending a client computer specific parameter to the host computer via the network; and
sending a media data stream to the client computer via the network according to the client specific parameter.

11. The method of claim 10, wherein detecting the media data stream transmission change occurs at a regular interval.

12. The method of claim 10, wherein detecting the media data stream occurs at a specific departure from a current transmission rate.

13. The method of claim 10, wherein the media data stream is sent to the client computer while another media data stream to another client is sent at an independent rate.

14. The method of claim 1, wherein the media data includes a video image, and further comprising:
selecting a region of the video image to view on the client computer;
sending a request to the host computer via the network requesting transmittal of data corresponding to the selected region of the video image; and
sending data to the client computer via the network corresponding to the selected region of the video image.

15. The method of claim 14, wherein successive regions are selected and viewed permitting panning.

16. The method of claim 1, further comprising updating a dynamic domain name system (DNS) by a host with a dynamic IP address comprising a process of:
connecting the host to the network;
determining if the host has a new IP address;
checking for a subsequent IP address change at regular intervals; and
if the host has a new IP address, then:
sending a request to a DNS server to update the IP address; and
sending to the host updated status from the DNS server.

17. The method of claim 16, wherein the DNS server provides the client computer with an updated IP address.

18. The method of claim 16, wherein the host computer specifies a schedule of availability to the DNS server.

19. The method of claim 16, wherein the DNS host server directs the client to a message website posting the host's schedule, if the host is unavailable.

20. The method of claim 16, wherein the DNS host server monitors when the host is connected to the network and when the host is not connected the DNS host server refers the client to a message website posting the host's schedule.

21. The method of claim 1, further comprising transmitting the module to the client computer via the network.

22. The method of claim 21, wherein
transmitting the module to the client computer comprises transmitting a Java module to the client computer via the network.

23. The method of claim 22, further comprising launching the Java module on the client computer via the network.

24. The method of claim 1, wherein said media data comprises recorded media data.

25. The method of claim 1, wherein the media data is streamed to the client computer while other media data is streamed to another client at an independent rate according to a client specific parameter for said another client.

26. A method of distributing media data to a client computer via a network from a host computer, comprising:
receiving a data request at the host computer from a client computer via the network;
launching a module on the client computer;
receiving a client computer specific parameter from the module on the client computer;
streaming media data to the client computer from the host computer via the network according to the client computer specific parameter; and
detecting video motion wherein detecting motion is performed on a frame level by comprising:
obtaining a reference video frame;
obtaining a current video frame;
determining motion detection on a block level comparing the current video frame to the reference video frame such that a number of blocks with motion detection is determined;
calculating a fraction of video blocks having motion;
if the fraction is below a low threshold value, then no motion is detected for the current video frame;
if the fraction is above the low threshold value, then determining if the fraction is below a medium threshold value;
if the fraction is below the medium threshold value, then performing a slight response and logging subsequent images;
if the fraction is above the medium threshold value, then determining if fraction is below a high threshold value;
if the fraction is below the high threshold value, then performing a moderate response and logging subsequent images; and if the fraction is above the high threshold value, then performing a severe response and logging subsequent images.

27. The method of claim 26, wherein performing the slight response comprises at least one of transmitting a first email notification to an address determined by the host user, sounding an audible alert, originating a phone call to a first number determined by the host user, or initiating predetermined control of external hardware.

28. The method of claim 26, wherein performing the moderate response comprises at least one of transmitting a first email notification to an address determined by the host user, sounding an audible alert, originating a phone call to a first number determined by the host user, initiating predetermined control of external hardware, transmitting a second email message indicating the detected motion lies within the second range, or initiating a second predetermined phone message directed to a phone number determined by the host user.

29. The method of claim 26, wherein performing the severe response comprises at least one of transmitting a third email message to a predetermined address, originating a phone call with a "severe" message to a predetermined phone number, originating a phone call to a predetermined emergency phone number, or controlling external hardware associated with severe responses.

30. The method of claim 26, wherein the logged images are time stamped.

31. The method of claim 26, wherein the client computer specific parameter is selected from the group consisting of video source selection, frame rate, compression level, image resolution, image brightness, image contrast, and image view.

* * * * *